United States Patent
Han et al.

(10) Patent No.: US 12,352,594 B2
(45) Date of Patent: Jul. 8, 2025

(54) GUIDE LINE DISPLAY METHOD AND APPARATUS, DEVICE, AND MEDIUM

(71) Applicant: TENCENT TECHNOLOGY (SHENZHEN) COMPANY LIMITED, Shenzhen (CN)

(72) Inventors: Chao Han, Shenzhen (CN); Lei Feng, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 96 days.

(21) Appl. No.: 18/352,781

(22) Filed: Jul. 14, 2023

(65) Prior Publication Data

US 2023/0375358 A1 Nov. 23, 2023

Related U.S. Application Data

(63) Continuation of application No. PCT/CN2022/128412, filed on Oct. 28, 2022.

(30) Foreign Application Priority Data

Jan. 20, 2022 (CN) .......................... 202210067005.0

(51) Int. Cl.
   *G01C 21/36* (2006.01)
   *G01C 21/34* (2006.01)
(52) U.S. Cl.
   CPC ..... *G01C 21/3635* (2013.01); *G01C 21/3658* (2013.01); *G01C 21/3676* (2013.01); *G01C 21/3415* (2013.01)

(58) Field of Classification Search
   CPC ............ G01C 21/3635; G01C 21/3658; G01C 21/3676; G01C 21/3415
   (Continued)

(56) References Cited

U.S. PATENT DOCUMENTS 9,428,187 B2 * 8/2016 Lee ........................ B60W 30/12
10,210,406 B2 * 2/2019 Huang ...................... G01S 5/16
(Continued)

FOREIGN PATENT DOCUMENTS

CN 108955713 A 12/2018
CN 111114544 A 5/2020
(Continued)

OTHER PUBLICATIONS

The World Intellectual Property Organization (WIPO) International Search Report for PCT/CN2022/128412 Jan. 28, 2023 5 Pages (including translation).

(Continued)

*Primary Examiner* — Kerri L McNally
(74) *Attorney, Agent, or Firm* — ANOVA LAW GROUP, PLLC

(57) ABSTRACT

A guide line display method includes: obtaining a first guide line generated at an $i^{th}$ moment and a second guide line generated at an $(i+1)^{th}$ moment; pairing positioning points on the first guide line and the second guide line to obtain k matching point pairs; generating a transition guide line by concatenating k intermediate points of the k matching point pairs, the transition guide line being a guide line that transitions from the first guide line displayed at the $(i+1)^{th}$ moment to the second guide line displayed at an $(i+2)^{th}$ moment; and displaying the transition guide line between the $(i+1)^{th}$ moment and the $(i+2)^{th}$ moment.

20 Claims, 13 Drawing Sheets

(58) Field of Classification Search
USPC .................................................. 340/995.19
See application file for complete search history.

(56) References Cited

U.S. PATENT DOCUMENTS

| | | | |
|---|---|---|---|
| 2017/0192436 A1* | 7/2017 | Min | G05D 1/028 |
| 2018/0038693 A1* | 2/2018 | Dong | G06F 16/9537 |
| 2021/0293564 A1* | 9/2021 | Deng | G01C 21/3863 |
| 2022/0204026 A1* | 6/2022 | Kim | B60W 60/0015 |
| 2023/0070760 A1* | 3/2023 | He | G01C 21/3815 |
| 2023/0375358 A1 | 11/2023 | Han et al. | |

FOREIGN PATENT DOCUMENTS

| | | | |
|---|---|---|---|
| CN | 114419192 A | 4/2022 | |
| JP | H03505870 A | 7/1994 | |
| JP | H10214400 A | 8/1998 | |
| JP | H11259669 A | 9/1999 | |
| JP | 2008232671 A | 10/2008 | |
| JP | 2017033542 A | 2/2017 | |
| JP | 2017090301 A | 5/2017 | |
| WO | 2020125686 A1 | 6/2020 | |

OTHER PUBLICATIONS

The Japan Patent Office (JPO) Notification of Reasons for Refusal for Application No. 2024-523546 Feb. 4, 2025 6 Pages (including translation).

* cited by examiner

GUIDE LINE DISPLAY METHOD AND APPARATUS, DEVICE, AND MEDIUM

CROSS-REFERENCES TO RELATED APPLICATIONS

This application is a continuation application of PCT Patent Application No. PCT/CN2022/128412, filed on Oct. 28, 2022, which claims priority to Chinese Patent Application No. 202210067005.0, entitled "GUIDE LINE DISPLAY METHOD AND APPARATUS, DEVICE, MEDIUM, AND PROGRAM PRODUCT" filed on Jan. 20, 2022, the entire contents of both of which are incorporated herein by reference.

FIELD OF THE TECHNOLOGY

Embodiments of the present disclosure belong to the field of navigation maps, and in particular, relate to a guide line display method and apparatus, a device, a medium, and a program product.

BACKGROUND

A guide line is a lane-level guideline displayed on a navigation map interface for guiding a vehicle to a destination. The guide line extends along a lane line and has a particular length.

In the related art, the guide line is automatically refreshed periodically (such as one second), and an obvious jump may occur in guide lines displayed at adjacent moments. How to transitionally display an intermediate screen between the adjacent moments to alleviate the jump of the guide lines that is generated during the automatic refresh process has become a technical problem that needs to be resolved urgently.

SUMMARY

The present disclosure provides a guide line display method and apparatus, a device, a medium, and a program product, which improve display fineness and animation smoothness of a guide line animation The technical solutions are as follows:

According to an aspect of the present disclosure, a guide line display method is provided, the method being performed by a terminal and including: obtaining a first guide line generated at an $i^{th}$ moment and a second guide line generated at an $(i+1)^{th}$ moment, the first guide line and the second guide line being configured to guide a vehicle to a destination on a navigation map, and i being a positive integer; pairing positioning points on the first guide line and the second guide line to obtain k matching point pairs, k being a positive integer; generating a transition guide line by concatenating k intermediate points of the k matching point pairs, the transition guide line being a guide line that transitions from the first guide line displayed at the $(i+1)^{th}$ moment to the second guide line displayed at an $(i+2)^{th}$ moment; and displaying the transition guide line between the $(i+1)^{th}$ moment and the $(i+2)^{th}$ moment.

According to another aspect of the present disclosure, a guide line display apparatus is provided, including: an obtaining module, configured to obtain a first guide line generated at an $i^{th}$ moment and a second guide line generated at an $(i+1)^{th}$ moment, the first guide line and the second guide line being configured to guide a vehicle to a destination on a navigation map, and i being a positive integer; a pairing module, configured to pair positioning points on the first guide line and the second guide line to obtain k matching point pairs, k being a positive integer; a generation module, configured to generate a transition guide line by concatenating k intermediate points of the k matching point pairs, the transition guide line being a guide line that transitions from the first guide line displayed at the $(i+1)^{th}$ moment to the second guide line displayed at an $(i+2)^{th}$ moment; and a display module, configured to display the transition guide line between the $(i+1)^{th}$ moment and the $(i+2)^{th}$ moment.

According to an aspect of the present disclosure, a computer device is provided, including: at least one processor and at least one memory, the at least one memory storing a computer program, and the computer program being loaded and executed by the at least one processor to implement the guide line display method described above.

According to another aspect of the present disclosure, a non-transitory computer-readable storage medium is provided, storing a computer program, the computer program being loaded and executed by at least one processor to implement the guide line display method described above.

The technical solutions provided in the embodiments of the present disclosure have at least the following beneficial effects:

Positioning points on a first guide line generated at an $i^{th}$ moment and/or a second guide line generated at an $(i+1)^{th}$ moment are paired to obtain k matching point pairs, a transition guide line is generated by concatenating k intermediate points of the k matching point pairs, and the transition guide line is displayed between the $(i+1)^{th}$ moment and the $(i+2)^{th}$ moment. The foregoing method reduces a guide line display difference between two adjacent frames in a guide line animation, and improves display fineness and animation smoothness of the guide line animation. In addition, a frame-level refresh effect of a liquid crystal display is improved due to reduction of difference pixels between the two adjacent frames, thereby presenting a softer and more detailed display effect of a guide line guiding a vehicle to a destination.

DESCRIPTION OF EMBODIMENTS

First, terms involved in the embodiments of the present disclosure are briefly introduced.

Figure 1:
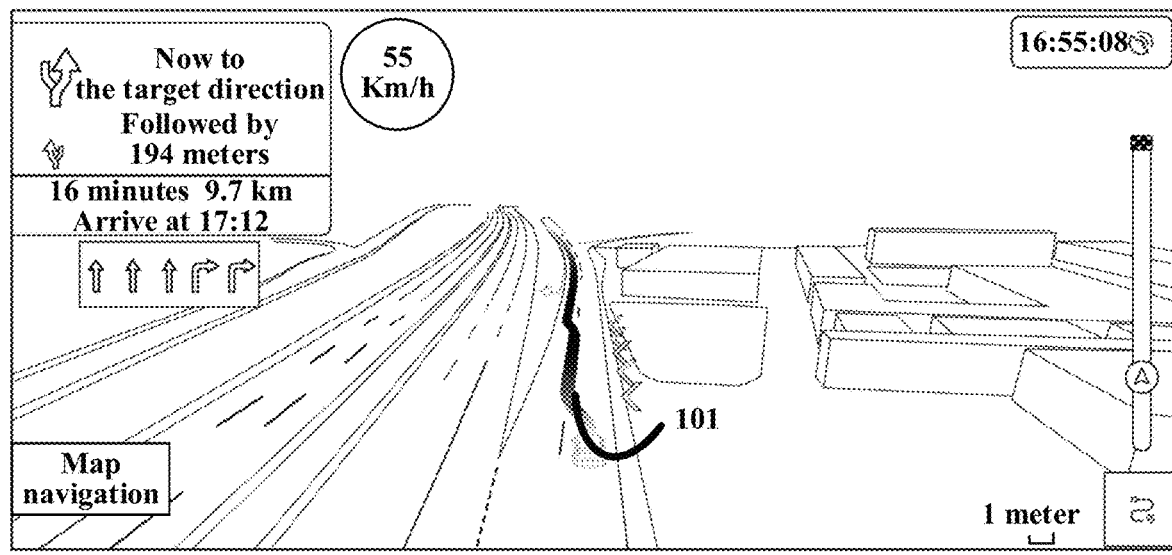
FIG. 1 is a schematic diagram of a guide line according to an exemplary embodiment of the present disclosure.

A guide line is a lane-level guideline displayed on a navigation map interface for guiding a vehicle to a destination. In an embodiment, the guide line is automatically refreshed for display on the navigation map interface every particular period of time (such as one second). For example, a first guide line is displayed on the navigation map interface at an $i^{th}$ moment, and a second guide line at an $(i+1)^{th}$ moment is displayed the next second. In an embodiment, a length of the guide line is obtained based on a preset. For example, a navigation map client sets a length of each segment of guide line to be 1 km, and the navigation map client sets an end point of the last guide line as a destination entered by a user. For example, FIG. 1 is a schematic diagram of a guide line according to an exemplary embodiment of the present disclosure. In this case, a guide line 101 displayed on a navigation map interface is a partial guide line of a guide line or all guide lines.

An intelligent traffic system (ITS), also referred to as an intelligent transportation system, is a comprehensive transportation system formed by effectively integrating advanced science and technology (information technology, computer technology, data communication technology, sensor technology, electronic control technology, automatic control theory, operational research, artificial intelligence, and the like) into transportation, service control, and vehicle manufacturing to strengthen the connection between vehicles, roads, and users, to ensure safety, improve efficiency, improve environment, and save energy.

Intelligent vehicle infrastructure cooperative systems (IV-ICS), referred to as a vehicle infrastructure cooperative system, are a development direction of ITS. The vehicle infrastructure cooperative system is a safe, efficient, and environmentally friendly road traffic system formed by using advanced wireless communication and new-generation Internet technologies to implement vehicle-vehicle and vehicle-road dynamic real-time information exchange in all aspects, and carry out vehicle active safety control and road cooperative management on the basis of all-time and spatial dynamic traffic information collection and integration to fully achieve effective cooperation of people, vehicles, and roads, ensure traffic safety, and improve traffic efficiency.

Figure 2:
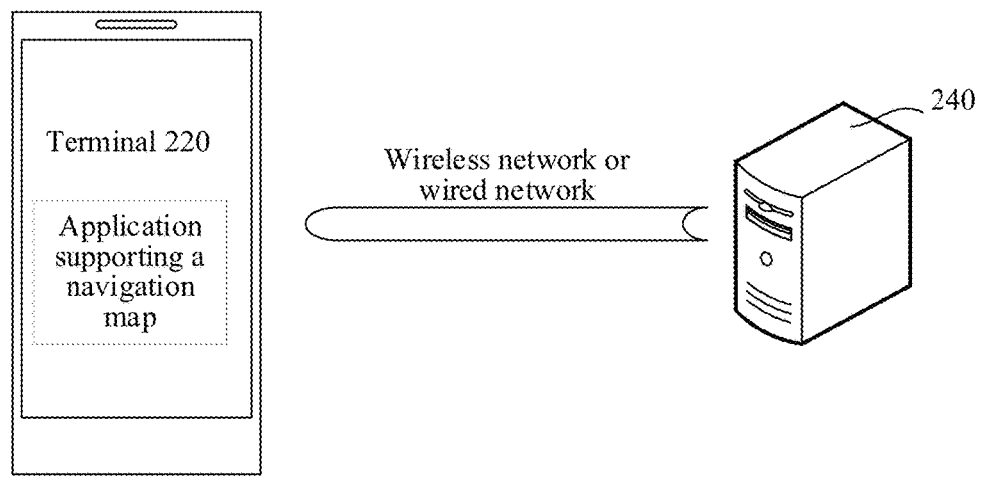
FIG. 2 is a structural block diagram of a computer system according to an exemplary embodiment of the present disclosure.

FIG. 2 is a structural block diagram of a computer system according to an exemplary embodiment of the present disclosure. The computer system 200 includes a terminal 220 and a server 240.

An application supporting a navigation map is installed and run on the terminal 220. The application supporting a navigation map may be any type of application that has a navigation map display function, for example, including but not limited to, a dedicated navigation map application, a mini program integrated and run in a host program (such as a social application or a shopping application) and has a navigation map display function, a quick application that has a navigation map display function, and the like. In the present disclosure, the terminal 220 may be a terminal used by a driver. The driver drives a vehicle to a destination under the guidance of a guide line displayed on the navigation map.

The terminal 220 is connected to the server 240 through a wireless network or a wired network.

The server 240 may be an independent physical server, or may be a server cluster or a distributed system including a plurality of physical servers, or may be a cloud server that provides basic cloud computing services such as a cloud service, a cloud database, cloud computing, a cloud function, cloud storage, a network service, cloud communication, a middleware service, a domain name service, a security service, a content delivery network (CDN), and big data and artificial intelligence platforms. In this embodiment of the present disclosure, the server 240 provides a backend service for the application supporting the navigation map.

In some embodiments, the application supporting the navigation map may run on different operating system platforms (Android or iOS). In some embodiments, device types of terminals 220 on which an application supporting a navigation map runs may be the same or different. The device types include at least one of: a smartphone, a smartwatch, a smart television, an in-vehicle terminal, a wearable device, a tablet computer, an ebook reader, an MP3 player, an MP4 player, and a laptop portable computer. The following embodiment is described by using an example in which the terminal includes a smartphone.

A person skilled in the art may learn that there may be more or fewer terminals. For example, there may be only one terminal, or there may be dozens of or hundreds of or more terminals. The number and the device type of the terminal are not limited in the embodiments of the present disclosure.

Figure 3:
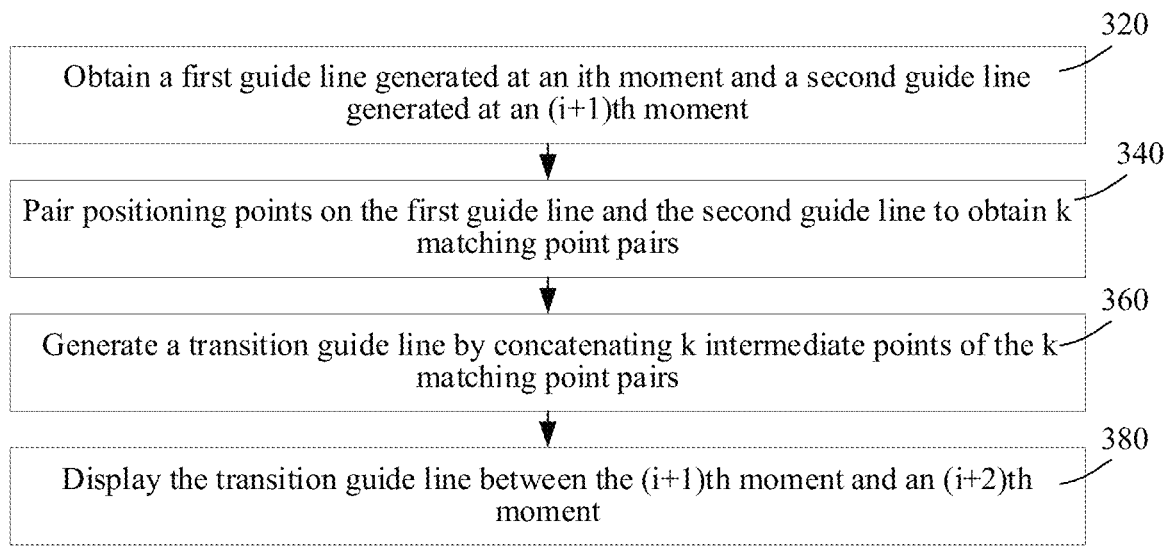
FIG. 3 is a flowchart of a guide line display method according to an exemplary embodiment of the present disclosure.

To improve display fineness and animation smoothness of a guide line animation, FIG. 3 is a flowchart of a guide line display method according to an exemplary embodiment of the present disclosure. An example in which the method is applied to the terminal 220 (or the application on the terminal 220 supporting the navigation map) shown in FIG. 2 is used for description. The method includes the following steps:

Step 320. Obtain a first guide line generated at an $i^{th}$ moment and a second guide line generated at an $(i+1)^{th}$ moment.

A guide line is a lane-level guideline displayed on a navigation map interface for guiding a vehicle to a destination. In an embodiment, a guide line is a lane-level guideline that is always parallel to a lane line and that is generated with a current position of a vehicle as a starting point and a destination as an end point. In an embodiment, a length of the guide line is obtained based on a preset. For example, a navigation map client sets a length of each segment of guide line to be 1 km. In another embodiment, a length of the guide line is obtained through dynamic division. For example, the navigation map client sets the length of the guide line to be related to a driving speed of the vehicle at the current moment, and if the driving speed is high, a relatively long guide line is generated, or if the driving speed is low, a relatively short guide line is generated. In an embodiment, the guide line is automatically refreshed for display on the navigation map interface every particular period of time (such as one second). For example, FIG. 1 is a schematic diagram of a guide line according to an exemplary embodiment of the present disclosure. In this case, a guide line 101 displayed on a navigation map interface is a partial guide line of a guide line or all guide lines.

First guide line: The first guide line is a guide line generated at the $i^{th}$ moment and used for guiding a vehicle to a destination, and the first guide line is displayed on the navigation map interface at the $(i+1)^{th}$ moment. In some embodiments, an interval between two adjacent moments is one second. In an embodiment, the terminal obtains a current position of the vehicle through Global Positioning System (GPS) positioning at the $i^{th}$ moment, and performs calculation according to lane-level road network data and the destination to obtain the first guide line. i is a positive integer.

In an embodiment, in response to an initial position and a destination entered by a user before the navigation starts, a server feeds back lane-level road network data between the initial position and the destination to the terminal. In some embodiments, the lane-level road network data includes lane lengths, lane orientations, the number of lanes, connection statuses between lanes, whether the lanes are congested, the number of traffic lights, and the like for the lanes passed between the initial position and the destination. In the present disclosure, the lane-level road network data is used by the terminal to generate a guide line. For example, the terminal plans a segment of guide line (the first guide line) for the vehicle from the position at the $i^{th}$ moment to the destination according to the lane-level road network data. For example, the terminal generates a guide line indicating that "Go straight 194 meters, then change to the left lane, and then go straight 1000 meters".

In some embodiments, the user may enter an initial position through GPS positioning. In some embodiments, the user may enter an initial position manually. For example, the user enters an initial position through a virtual keyboard, or the user selects an initial position by clicking/tapping a position option provided by a navigation map, or the user selects an initial position by clicking/tapping a building or a road on a navigation map.

Second guide line: The second guide line is a guide line generated at the $(i+1)^{th}$ moment and used for guiding a vehicle to a destination, and the second guide line is displayed on the navigation map interface at the $(i+2)^{th}$ moment. In some embodiments, an interval between two adjacent moments is one second. In an embodiment, the terminal obtains a current position of the vehicle through GPS positioning at the $(i+1)^{th}$ moment, and performs calculation according to lane-level road network data and the destination to obtain the second guide line.

If the vehicle is not on the planned route of the first guide line at the $(i+1)^{th}$ moment at which the second guide line is generated, there is no overlapping route between the second guide line and the first guide line. If the vehicle is on the planned route of the first guide line at the $(i+1)^{th}$ moment at which the second guide line is generated, the second guide line partially overlaps the first guide line.

If the guide line generated by the vehicle passes through a final destination, the destination is used as an end point of the guide line, and planning of the guide line according to a preset length is stopped. In all embodiments of the present disclosure, for convenience of discussion, it is considered that neither of the first guide line generated at the $i^{th}$ moment and the second guide line generated at the $(i+1)^{th}$ moment pass through the destination.

Step 340. Pair positioning points on the first guide line and the second guide line to obtain k matching point pairs.

A positioning point refers to an endpoint or a turning point on a guide line. The endpoint includes a starting point and an end point of the guide line. The turning point refers to a lane change point on the guide line. A vehicle changes lanes at a road position indicated by the turning point.

For convenience of discussion, in all the embodiments of the present disclosure, it is considered that the vehicle moves between the $i^{th}$ moment and the $(i+1)^{th}$ moment.

In an embodiment, that the terminal pairs positioning points on the first guide line and the second guide line to obtain k matching point pairs includes: The terminal determines, on the second guide line, m' first corresponding points mapped to m positioning points on the first guide line; and/or determines, on the first guide line, n' second corresponding points mapped to n positioning points on the second guide line to obtain k matching point pairs in total, each of the matching point pairs including the positioning points and the corresponding points mapped to each other.

In an embodiment, there two cases for the terminal generating a first guide line at an $i^{th}$ moment and generating a second guide line at an $(i+1)^{th}$ moment:

In a first case: at the $(i+1)^{th}$ moment, the vehicle is on a route planned by the navigation map, that is, the vehicle has not yawed.

Figure 4:
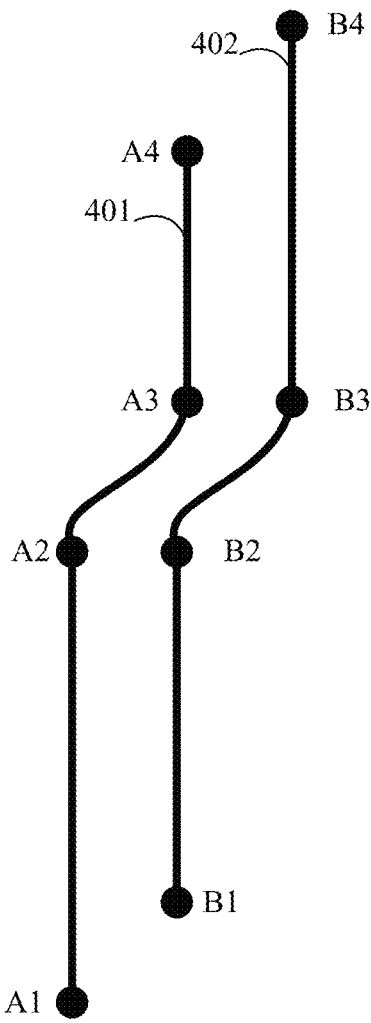
FIG. 4 is a schematic diagram of a first guide line and a second guide line according to an exemplary embodiment of the present disclosure.

For example, FIG. 4 shows a first guide line 401 generated at the $i^{th}$ moment and a second guide line 402 generated at the $(i+1)^{th}$ moment in response to that the vehicle has not yawed. At the $i^{th}$ moment, the vehicle is located at a road position indicated by a positioning point A1. At the $(i+1)^{th}$ moment, the vehicle is located at a road position indicated by a positioning point B1. At the $(i+1)^{th}$ moment, the vehicle has not yawed, and the vehicle is located on a route planned by the first guide line generated at the $i^{th}$ moment.

For example, the first guide line 401 includes four positioning points: a starting point A1, a turning point A2, a turning point A3, and an end point A4. The second guide line 402 includes four positioning points: a starting point B1, a turning point B2, a turning point B3, and an end point B4. In an embodiment, the terminal determines, on the second guide line 402, four first corresponding points mapped to the starting point A1, the turning point A2, the turning point A3, and the end point A4; and/or the terminal determines, on the first guide line 401, four second corresponding points mapped to the starting point B1, the turning point B2, the turning point B3, and the end point B4 to obtain k matching point pairs in total. For the pairing method of the first case, refer to detail descriptions of a first pairing method and a third to a fifth pairing methods described below.

In a second case: at the $(i+1)^{th}$ moment, the vehicle is not on a route planned by the navigation map, that is, the vehicle has yawed.

Figure 5:
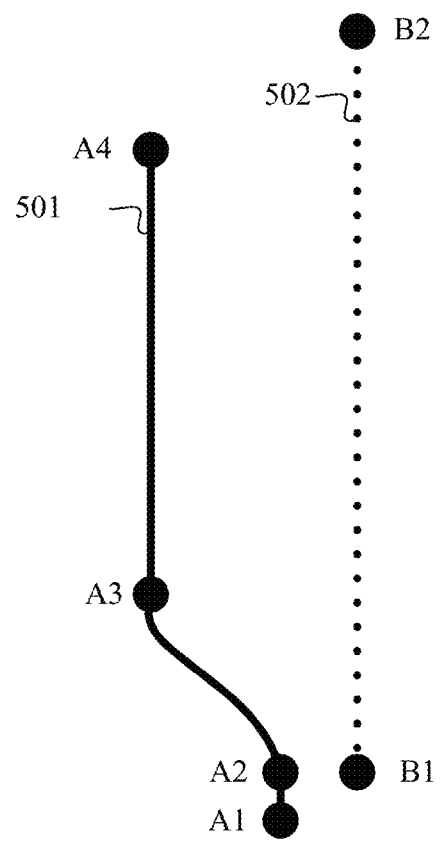
FIG. 5 is a schematic diagram of a first guide line and a second guide line according to another exemplary embodiment of the present disclosure.

For example, FIG. 5 shows a first guide line 501 generated at the $i^{th}$ moment and a second guide line 502 generated at the $(i+1)^{th}$ moment in response to that the vehicle has yawed. At the $i^{th}$ moment, the vehicle is located at a road position indicated by a positioning point A1. At the $(i+1)^{th}$ moment, the vehicle is located at a road position indicated by a positioning point B1. At the $(i+1)^{th}$ moment, the vehicle has yawed, that is, the vehicle is not located on a route planned by the first guide line generated at the $i^{th}$ moment, and a lane change curve A2A3 on the first guide line 501 is configured to guide the vehicle to change to the left lane.

For example, the first guide line 501 includes four positioning points: a starting point A1, a turning point A2, a turning point A3, and an end point A4. The second guide line 502 includes two positioning points: a starting point B1 and an end point B2. In an embodiment, the terminal determines, on the second guide line 502, four first corresponding points mapped to the starting point A1, the turning point A2, the turning point A3, and the end point A4; and/or the terminal determines, on the first guide line 501, two second corresponding points mapped to the starting point B1 and the end point B2 to obtain k matching point pairs in total. For the pairing method of the second case, refer to detail descriptions of a second to a fifth pairing methods described below.

Step 360. Generate a transition guide line by concatenating k intermediate points of the k matching point pairs.

Intermediate point: In an embodiment, a matching point pair includes a positioning point and a corresponding point. A positioning point on the first guide line and a corresponding point on the second guide line constitute a matching point pair. A positioning point on the second guide line and a corresponding point on the first guide line constitute a matching point pair. The intermediate point is a point obtained through interpolation and located between a positioning point and a corresponding point.

A transition guide line is a guide line that transitions from the first guide line displayed at the $(i+1)^{th}$ moment to the second guide line displayed at the $(i+2)^{th}$ moment. In all the embodiments of the present disclosure, the transition guide line is the key to resolve the problem of guide line jumping between adjacent moments. Setting a transition guide line can smoothly display a process of a guide line change.

In an embodiment, the terminal may concatenate the k intermediate points of the k matching point pairs in a straight line and/or in a curved line. In some embodiments, a manner of concatenating any two adjacent intermediate points is the same as a manner of concatenating adjacent positioning points on the first guide line or the second guide line. For example, if the positioning point A1 and the positioning point A2 are concatenated in a straight line, the corresponding two intermediate points are concatenated in a straight line. If the positioning point A2 and the positioning point A3 are concatenated in a curved line, the corresponding two intermediate points are concatenated in a curved line.

Step 380. Display the transition guide line between the $(i+1)^{th}$ moment and an $(i+2)^{th}$ moment.

At the $(i+1)^{th}$ moment, the terminal displays the guide line generated at the $i^{th}$ moment. At the $(i+2)^{th}$ moment, the terminal displays the guide line generated at the $(i+1)^{th}$ moment. Between the $(i+1)^{th}$ moment and the $(i+2)^{th}$ moment, the transition guide line is displayed. In an embodiment, after obtaining the transition guide line, the terminal performs modeling through triangulation, sets transparency of the transition guide line, and finally renders the transition guide line.

In summary, positioning points on a first guide line generated at an $i^{th}$ moment and/or a second guide line generated at an $(i+1)^{th}$ moment are paired to obtain k matching point pairs, a transition guide line is generated by concatenating k intermediate points of the k matching point pairs, and the transition guide line is displayed between the $(i+1)^{th}$ moment and the $(i+2)^{th}$ moment. This alleviates a user's feeling of jumping during observation of the guide line at adjacent moments and further optimizes an interface effect of the guide line guiding a vehicle to a destination.

The foregoing method further reduces a guide line display difference between two adjacent frames in a guide line animation, and improves display fineness and animation smoothness of the guide line animation. In addition, a frame-level refresh effect of a liquid crystal display is improved due to reduction of difference pixels between the two adjacent frames, thereby presenting a softer and more detailed display effect of a guide line guiding a vehicle to a destination.

In the method, m' first corresponding points mapped to m positioning points on the first guide line are also determined on the second guide line; and/or n' second corresponding points mapped to n positioning points on the second guide line are determined on the first guide line to obtain k matching point pairs, thereby providing a method for pairing positioning points on the first guide line and the second guide line.

First pairing method: Based on existence of positioning points belonging to the same road position on the first guide line and the second guide line, determine, on the second guide line, the m' first corresponding points mapped to the m positioning points on the first guide line, and determine, on the first guide line, the n' second corresponding points mapped to the n positioning points on the second guide line to obtain the k matching point pairs in total.

It is to be understood that, the first pairing method is applied to a case in which the second guide line is a guide line generated when the vehicle does not deviate from a planned route.

In an embodiment, the terminal pairs $m_1$ positioning points of the first guide line with $n_1$ positioning points of the second guide line to obtain $k_1$ matching point pairs, $m_1$, $n_1$, and $k_1$ having equal values, and any two paired positioning points in the $k_1$ matching point pairs indicating the same road position; and $m_1$, $n_1$, and $k_1$ each being a positive integer, and $m_1$, $n_1$, and $k_1$ each being less than a smaller value of m and n, in other words, $m_1$, $n_1$, and $k_1$ each being less than min(m, n). The terminal further pairs positioning points in the m positioning points other than the $m_1$ positioning points with a starting point of the second guide line to obtain $k_2$ matching point pairs; and pairs positioning points in the n positioning points other than the $n_1$ positioning points with an end point of the first guide line to obtain $k_3$ matching point pairs, $k_2$ and $k_3$ each being a positive integer.

Figure 6:
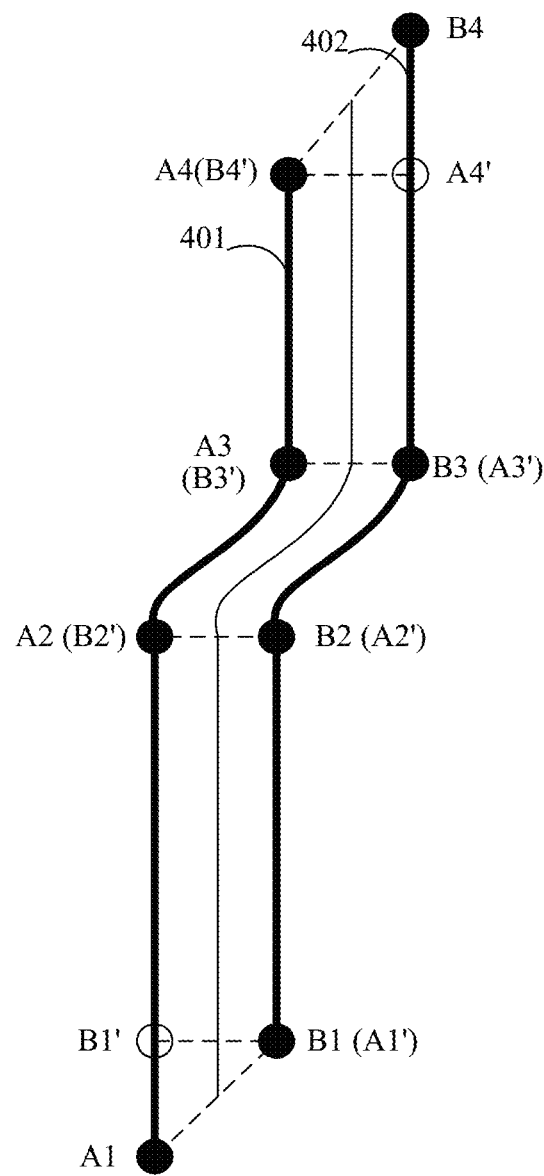
FIG. 6 is a schematic diagram of a first pairing method according to an exemplary embodiment of the present disclosure.

For example, with reference to FIG. 6, the turning point A2 (B2') on the first guide line 401 indicates the same road position as the turning point B2 (A2') on the second guide line 402, and the turning point A3 (B3') on the first guide line 401 indicates the same road position as the turning point B3(A3') on the second guide line 402. The starting point B1 of the second guide line indicates the same road position as a first corresponding point B 1' on the first guide line 401. The end point A4 of the first guide line indicates the same road position as a second corresponding point A4' on the second guide line 402.

The terminal further pairs the last positioning point (the starting point A1 of the first guide line 401) on the first guide line 401 with the starting point B1(A1') of the second guide line 402, and pairs the last positioning point (the end point B4 of the second guide line 402) on the second guide line 402 with the end point A4(B4') of the first guide line 401.

Through the foregoing pairing process, a total of six matching point pairs between the first guide line 401 and the second guide line 402 can be obtained.

In summary, positioning points indicating the same road position on the first guide line and the second guide line are paired, so that a sum of distances between the positioning points and the corresponding points in the matching point pairs is minimized, thereby further ensuring stability of the generated transition guide line, the second guide line being generated in response to that the vehicle does not deviate from the planned route.

Second pairing method: Determine, on the second guide line based on endpoints of the first lane change curve on the first guide line, the m' first corresponding points mapped to the m positioning points on the first guide line to obtain the k matching point pairs.

It is to be understood that, the second pairing method is applied to a case in which the second guide line is a guide line generated when the vehicle deviates from a planned route. In this case, the vehicle passes an intersection for lane change between the $i^{th}$ moment and the $(i+1)^{th}$ moment, and does not change lanes according to the planned route. Therefore, there is a lane change curve on the first guide line generated at the $i^{th}$ moment, while there is no lane change curve on the second guide line generated at the $(i+1)^{th}$ moment.

In an embodiment, the terminal projects two endpoints of the first lane change curve on the first guide line onto the second guide line to obtain two corresponding points, and pairs the two endpoints of the first lane change curve with the two corresponding points to obtain two matching point pairs. The terminal further pairs a starting point of the first guide line with a starting point of the second guide line to obtain a matching point pair; and pairs an end point of the first guide line with an end point of the second guide line to obtain a matching point pair.

Figure 7:
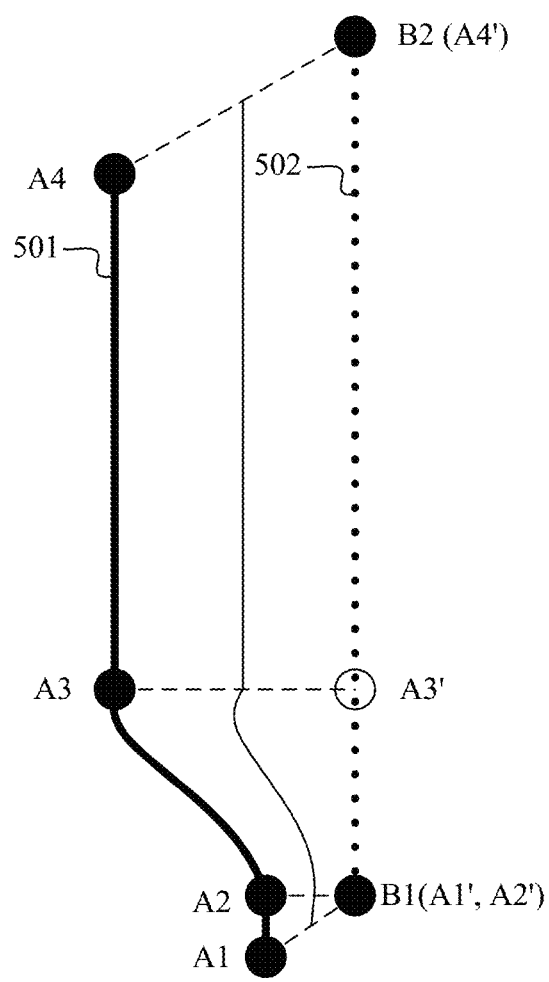
FIG. 7 is a schematic diagram of a second pairing method according to an exemplary embodiment of the present disclosure.

For example, with reference to FIG. 7, the endpoint A2 of the first lane change curve on the first guide line 501 is projected onto the second lane change curve 502 to obtain a corresponding point A2', and the endpoint A3 of the first lane change curve on the first guide line 501 is projected onto the second lane change curve 502 to obtain a corresponding point A3'.

The terminal further pairs the starting point A1 of the first guide line 501 with the starting point B1(A1') of the second guide line 502. The terminal further pairs the end point A4 of the first guide line 501 with the end point B2(A4') of the second guide line 502.

Through the foregoing pairing process, a total of four matching point pairs between the first guide line 501 and the second guide line 502 can be obtained.

In another embodiment, the terminal further divides the first lane change curve into L segments according to a preset division length. Therefore, there are L+1 positioning points in total on the first lane change curve. The terminal projects the L+1 positioning points onto the second guide line to obtain L+1 corresponding points, obtain L+1 matching point pairs in total on the first lane change curve, and obtain L+3 matching point pairs in total on the first guide line.

For example, the positioning points on the first lane change curve include the endpoint A2 and the endpoint A3 of the first lane change curve and intermediate points P1, P2, and P3 (in this case, the first lane change curve is divided into four segments). The terminal projects the endpoint A2 and the endpoint A3 of the first lane change curve and the intermediate points P1, P2, and P3 onto the second guide line to obtain corresponding points A2', A3', P1', P2', and P3'. The terminal further pairs the starting point A1 of the first guide line with the starting point B1 of the first guide line. The terminal further pairs the end point A4 of the first guide line with the end point B2 of the first guide line. In this case, a total of seven matching point pairs are obtained.

In summary, an endpoint of a lane change curve of the first guide line is projected onto the second guide line to obtain a second corresponding point, and the endpoint of the lane change curve is paired with the second corresponding point. The second guide line is generated in response to that the vehicle deviates from the planned route, thereby ensuring stability of the second guide line.

The following further describes three pairing methods. The pairing methods described below do not limit whether the vehicle deviates from the planned route at the $(i+1)^{th}$ moment.

Third pairing method: Pair the m positioning points on the first guide line with the n positioning points on the second guide line point by point in sequence to obtain the k matching point pairs, k being equal to a larger value of m and n. In other words, k is equal to max(m, n).

In an embodiment, in response to that j is less than m and less than n, the terminal pairs a $j^{th}$ of the m positioning points with a $j^{th}$ of the n positioning points. The terminal further pairs a $j^{th}$ of the m positioning points with a first endpoint of the second guide line in response to that m is greater than n and j is not less than n and not greater than m. The terminal further pairs a $j^{th}$ of the n positioning points with a second endpoint of the first guide line in response to that m is less than n and j is not less than m and not greater than n. Finally, the terminal determines to obtain the k matching point pairs, a value of k being m or n, and j being a positive integer.

The m positioning points and the n positioning points are all arranged in sequence according to a direction of progress of a road, and in this case, the first endpoint is an end point and the second endpoint is an end point. Alternatively, the m positioning points and the n positioning points are all arranged in reverse order according to a direction of progress of a road, and in this case, the first endpoint is a starting point and the second endpoint is a starting point.

Figure 8:
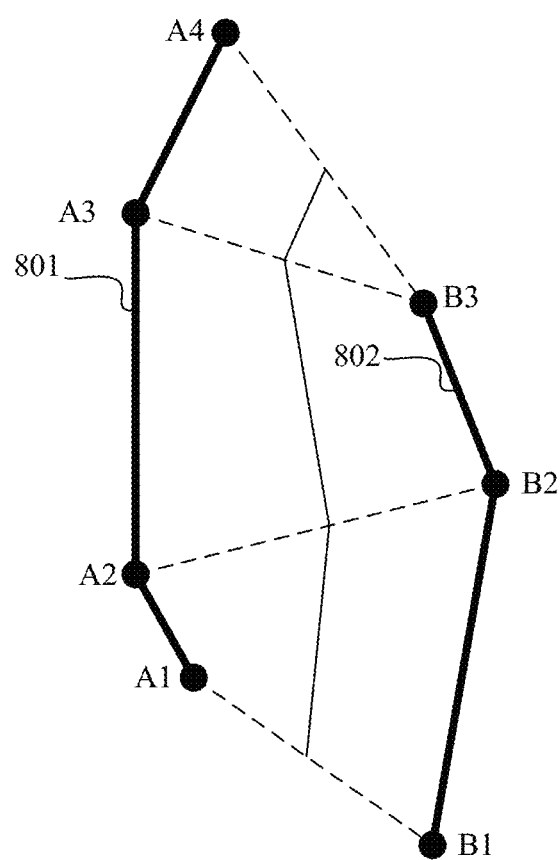
FIG. 8 is a schematic diagram of a third pairing method according to an exemplary embodiment of the present disclosure.

For example, with reference to FIG. 8, there are four positioning points on a first guide line 801, including a positioning point A1, a positioning point A2, a positioning point A3, and a positioning point A4. There are three positioning points on a second guide line 802, including a positioning point B1, a positioning point B2, and a positioning point B3.

No matter whether the four positioning points A1, A2, A3, and A4 on the first guide line 801 and the three positioning points B1, B2, and B3 on the second guide line 802 are arranged in sequence according to the direction of progress of the road (in this case, A1 is a starting point and A4 is an end point; and B1 is a starting point and B3 is an end point), or arranged in reverse order according to the direction of progress of the road (in this case, A1 is an end point and A4 is a starting point; and B1 is an end point and B3 is a starting point), the positioning point A1 is paired with the positioning point B 1, the positioning point A2 is paired with the positioning point B2, the positioning point A3 is paired with the positioning point B3, and the positioning point A4 is paired with the positioning point B3.

Through the foregoing pairing process, a total of four matching point pairs between the first guide line 801 and the second guide line 802 can be obtained.

In summary, the positioning points on the first guide line are paired with the positioning points on the second guide line point by point in sequence, so that all the positioning points on the first guide line and the second guide line can participate in the pairing, and the pairing method is simple and needs only to determine the positioning points on the guide lines. The pairing method is further used for achieving an animation effect of the guide line.

Fourth pairing method: Project the m positioning points on the first guide line onto the second guide line to obtain the m' first corresponding points, and project the n positioning points on the second guide line onto the first guide line to obtain the n' second corresponding points, to obtain the k matching point pairs in total.

In an embodiment, the terminal projects $m_2$ positioning points on the first guide line onto the second guide line to obtain $m_2$' first corresponding points, and the terminal pairs the $m_2$ positioning points with the $m_2$' first corresponding points to obtain $k_4$ matching point pairs. The terminal further pairs positioning points in the m positioning points other than the $m_2$ positioning points with a third endpoint of the second guide line to obtain $k_5$ matching point pairs.

The terminal further projects $n_2$ positioning points on the second guide line onto the first guide line to obtain $n_2$' second corresponding points, and the terminal pairs the $n_2$ positioning points with the $n_2$' second corresponding points to obtain $k_6$ matching point pairs. The terminal further pairs positioning points in the n positioning points other than the $n_2$ positioning points with a fourth endpoint of the first guide line to obtain $k_7$ matching point pairs. The third endpoint is an end point, and the fourth endpoint is a starting point; or the third endpoint is a starting point, and the fourth endpoint is an end point. $m_2$, $m_2$', $n_2$, $n_2$', $k_4$, $k_5$, $k_6$ and $k_7$ are each a positive integer.

Figure 9:
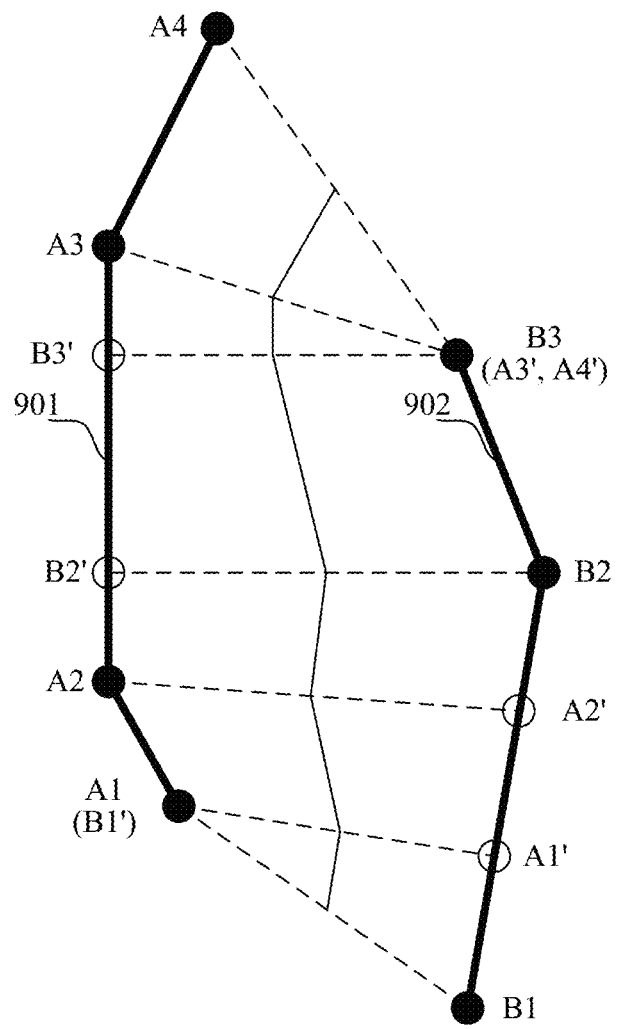
FIG. 9 is a schematic diagram of a fourth pairing method according to an exemplary embodiment of the present disclosure.

For example, with reference to FIG. 9, there are four positioning points on a first guide line 901, including a positioning point A1, a positioning point A2, a positioning point A3, and a positioning point A4. There are three positioning points on a second guide line 902, including a positioning point B1, a positioning point B2, and a positioning point B3. In FIG. 9, the positioning point A1 is a starting point, the positioning point A4 is an end point, the positioning point B1 is a starting point, and the positioning point B3 is an end point; or the positioning point A1 is an end point, the positioning point A4 is a starting point, the positioning point B1 is an end point, and the positioning point B3 is a starting point.

The terminal projects the positioning point A1 onto the second guide line 902 to obtain a corresponding point A1'. The terminal projects the positioning point A2 onto the second guide line 902 to obtain a corresponding point A2'. The terminal projects the positioning point B2 onto the first guide line 901 to obtain a corresponding point B2'. The terminal projects the positioning point B3 onto the first guide line 901 to obtain a corresponding point B3'.

The terminal further pairs the positioning point A4 on the first guide line 901 with a corresponding point A4' (B3) on the second guide line 902. The terminal further pairs the positioning point A3 on the first guide line 901 with a corresponding point A3' (B3) on the second guide line 902. The terminal further pairs the positioning point B1 on the second guide line 902 with a corresponding point B1' (A1) on the first guide line 901.

Through the foregoing pairing process, a total of seven matching point pairs between the first guide line 901 and the second guide line 902 can be obtained.

In the case shown in FIG. 9, all other positioning points on the second guide line except the positioning point with a projection are each connected to an endpoint on the first guide line. In fact, if the second guide line is slightly shorter, a plurality of positioning points on the second guide line except the positioning point allowed to have a projection each may be connected to a starting point on the first guide line. In addition, the plurality of positioning points on the second guide line except the positioning point with a projection are each connected to an end point on the first guide line.

Additionally, in the case shown in FIG. 9, all other positioning points on the first guide line except the positioning point with a projection are each connected to an endpoint on the second guide line. In fact, if the first guide line is shorter, a plurality of positioning points on the first guide line except the positioning point allowed to have a projection each may be connected to a starting point on the second guide line. In addition, the plurality of positioning points on the first guide line except the positioning point allowed to have the projection are each connected to an end point on the second guide line.

The pairing method shown in FIG. 9 is only an example. If a length of the first guide line and a length of the second guide line do not comply with the pairing method show in FIG. 9, a person skilled in the art can still pair the positioning points on the first guide line and the second guide line according to the length of the first guide line and the length of the second guide line with reference to the projection idea shown in FIG. 9. The pairing method shown in FIG. 9 in the present disclosure cannot limit the idea of pairing positioning points through projections.

For convenience of discussion, the pairing method of mapping positioning points by using projections that is involved in all the embodiments of the present disclosure is actually discussed based on relatively parallel relative positions used for the first guide line and the second guide line. However, actually, there may still be other cases of the relative positions between the first guide line and the second guide line (for example, an angle between an extension line of the first guide line and an extension line of the second guide line is 30°). The pairing method used only for discussing the mapping of positioning points by using projections in the present disclosure does not limit the relative positions between the first guide line and the second guide line.

In summary, the positioning points on the first guide line are projected onto the second guide line, and the positioning points on the second guide line are projected onto the first guide line, so that this pairing method achieves the positioning point pairing between the first guide line and the second guide line. In addition, this pairing method is further used for achieving an animation effect of a transition guide line, and the transition guide line obtained through this pairing method is smoother.

Fifth pairing method: Determine, on the second guide line based on positions of the m positioning points on the first guide line, the m' first corresponding points mapped to the m positioning points on the first guide line; determine, on the first guide line based on positions of the n positioning points on the second guide line, the n' second corresponding points mapped to the n positioning points on the second guide line; and determine to obtain the k matching point pairs.

In an embodiment, for a turning point in the m positioning points, the terminal pairs the turning point with a corresponding point on the second guide line to obtain $k_8$ matching point pairs, a second ratio of the turning point being the same as a second ratio of the corresponding point. For a turning point in the n positioning points, the terminal further pairs the turning point with a corresponding point on the first guide line to obtain $k_9$ matching point pairs, a second ratio of the turning point being the same as a second ratio of the corresponding point. The terminal further pairs a starting point of the first guide line with a starting point of the second guide line to obtain a matching point pair. The terminal further pairs an end point of the first guide line with an end point of the second guide line to obtain a matching point pair.

The second ratio of the turning point is a ratio of a distance between the turning point and a reference point of the guide line to a total length of the guide line. The second ratio of the corresponding point is a ratio of a distance between the corresponding point and a reference point of the guide line to a total length of the guide line. The reference point is a starting point or an end point of the guide line. $k_8$ and $k_9$ are each a positive integer.

Figure 10:
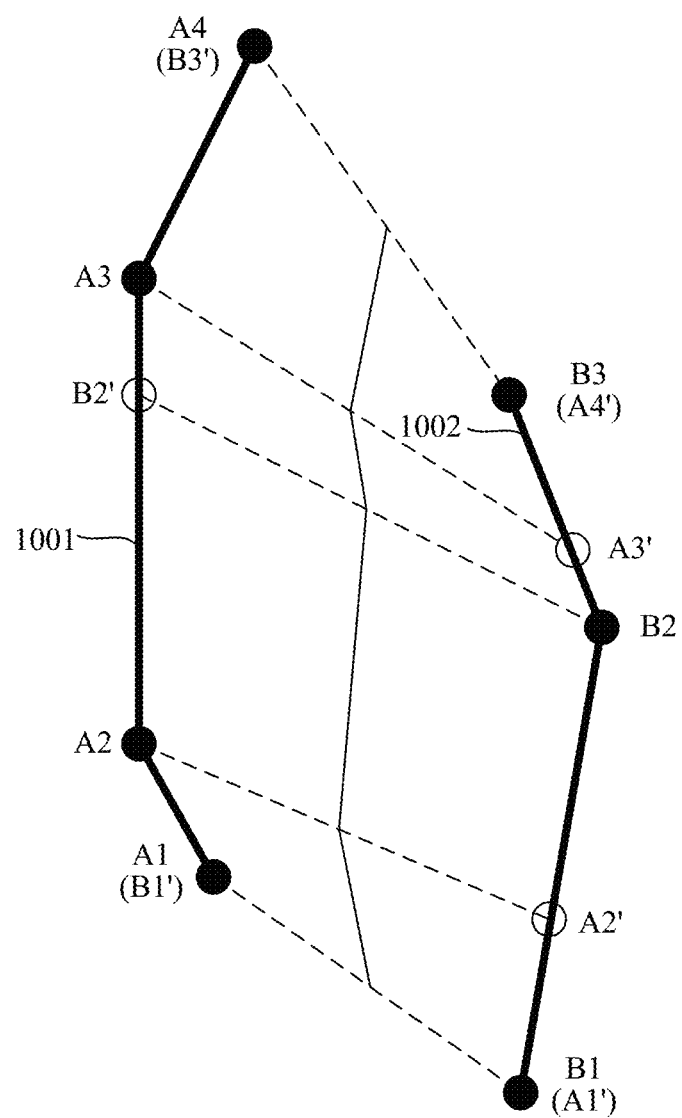
FIG. 10 is a schematic diagram of a fifth pairing method according to an exemplary embodiment of the present disclosure.

For example, in FIG. 10, there are four positioning points on a first guide line 1001, including a positioning point A1, a positioning point A2, a positioning point A3, and a positioning point A4. There are three positioning points on a second guide line 1002, including a positioning point B1, a positioning point B2, and a positioning point B3.

The terminal determines, on the second guide line 1002, a corresponding point A2' of the turning point A2. A ratio of a length between the corresponding point A2' and the positioning point B1 to a total length of the second guide line 1002 is the same as a ratio of a length between the positioning point A2 and the positioning point A1 to a total length of the first guide line 1001. Similarly, the terminal further determines, on the second guide line 1002, a corresponding point A3' of the turning point A3. The terminal further determines, on the first guide line 1001, a corresponding point B2' of the turning point B2.

The terminal further determines, on the second guide line 1002, a corresponding point A1' (B1) of the positioning point A1; determines, on the second guide line 1002, a corresponding point A4' (B3) of the positioning point A4; determines, on the first guide line 1001, a corresponding point B1' (A1) of the positioning point B 1; and determines, on the first guide line 1001, a corresponding point B3' (A4) of the positioning point B3. A1 and B1 are each a starting point, and A4 and B3 are each an end point; or A1 and B1 are each an end point, and A4 and B3 are each a starting point.

Through the foregoing pairing process, a total of five matching point pairs between the first guide line 1001 and the second guide line 1002 can be obtained.

In summary, length ratios between turning points and reference points on the first guide line and the second guide line are set to be the same, so that the pairing method achieves the positioning point pairing between the first guide line and the second guide line. In addition, the pairing method is further used for achieving an animation effect of a transition guide line.

The terminal determines a pairing method to be used among the third to the fifth pairing methods based on at least one of the following pairing principles.

First. Determine a pairing method based on the smallest number of generated matching point pairs.

With reference to FIG. 8, FIG. 9, and FIG. 10, in the third pairing method shown in FIG. 8, a total of four matching point pairs are generated; in the fourth pairing method shown in FIG. 9, a total of matching point pairs are generated; and in the fifth pairing method shown in FIG. 10, a total of five matching point pairs are generated. In consideration of only the current pairing principle, the third pairing method is the optimal pairing method.

Second. Determine a pairing method based on a smallest sum of distances of the generated k matching point pairs.

A distance of a matching point pair is a distance between lane positions indicated by a positioning point and a corresponding point. With reference to FIG. 8, FIG. 9, and FIG. 10, in consideration of only the current pairing principle, a pairing method corresponding to the smallest sum of distances in a sum of distances of the four matching point pairs shown in FIG. 8, a sum of distances of the seven matching point pairs shown in FIG. 9, and a sum of distances of the five matching point pairs shown in FIG. 10 is selected.

In summary, according to the foregoing pairing principle, a calculation capability of the terminal and a display effect of the transition guide line can be comprehensively considered, and the most suitable pairing method can be selected from the third to the fifth pairing methods.

Based on the example embodiment shown in FIG. 3, step 360 may be replaced with step S1.

S1. Generate a transition guide line by concatenating k intermediate points of the k matching point pairs, any two of the intermediate points having the same first ratio within respective matching point pairs, the first ratio being a ratio of first duration to second duration, the first duration being a difference between an intermediate moment corresponding to the intermediate point and a first moment, the second duration being a difference between the $(i+1)^{th}$ moment and the first moment, and the intermediate moment being obtained through interpolation between the $i^{th}$ moment and the $(i+1)^{th}$ moment.

Figure 11:
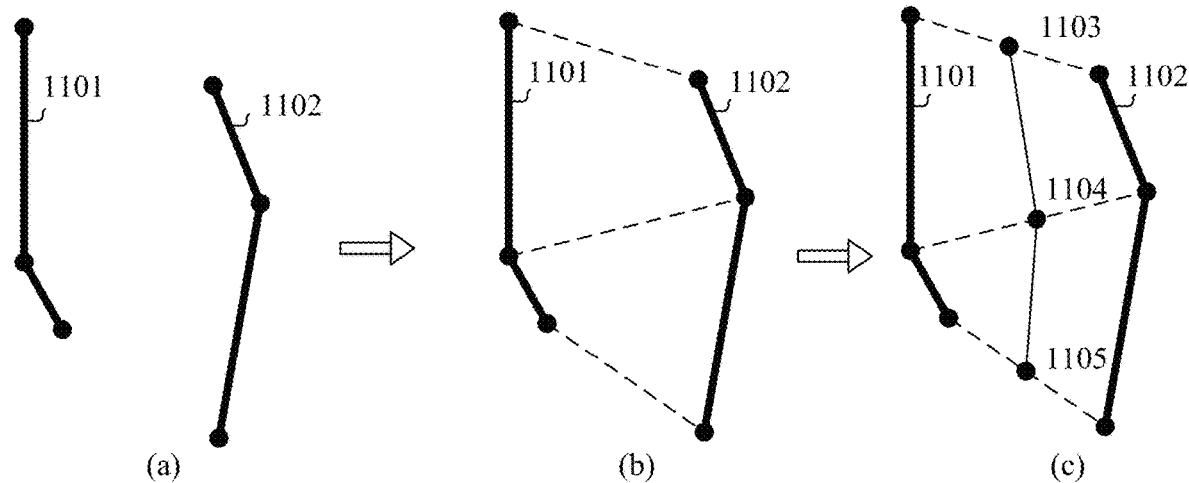
FIG. 11 is a schematic diagram of a process of generating a transition guide line according to an exemplary embodiment of the present disclosure.

For example, with reference to FIG. 11, (a) of FIG. 11 shows that the terminal obtains a first guide line 1101 and a second guide line 1102, (b) of FIG. 11 shows that the terminal pairs positioning points on the first guide line 1101 and the second guide line (the pairing method in this case is only illustrative), and (c) of FIG. 11 shows that after the positioning points on the first guide line 1101 and the second guide line are paired, the terminal determines an intermediate point 1103, an intermediate point 1104, and an intermediate point 1105. First ratios of the intermediate point 1103, the intermediate point 1104, and the intermediate point 1105 in their respective matching point pairs are the same. The first ratio is a ratio of first duration to second duration. The first duration is a difference between an intermediate moment corresponding to the intermediate point and a first moment. The second duration is a difference between the $(i+1)^{th}$ moment and the first moment. The intermediate moment is obtained through interpolation between the $i^{th}$ moment and the $(i+1)^{th}$ moment. In some embodiments, the intermediate moment is a central moment between the $i^{th}$ moment and the $(i+1)^{th}$ moment, that is, if the $i^{th}$ moment is second 1 and the $(i+1)^{th}$ moment is second 2, the intermediate moment is the second 1.5.

In summary, through linear interpolation and time-equal scaling calculation, a method for determining an intermediate point of a matching point pair is provided. The method is used for supporting generation of a transition guide line.

Based on the example embodiment shown in FIG. 3, "Obtain a first guide line generated at an $i^{th}$ moment" in step 320 may be replaced with the following steps:

1. Obtain a to-be-processed first guide line, the to-be-processed first guide line including a first line segment, a second line segment, and a third line segment connected end to end, and the second line segment being configured to guide the vehicle to change lanes.

Figure 12:
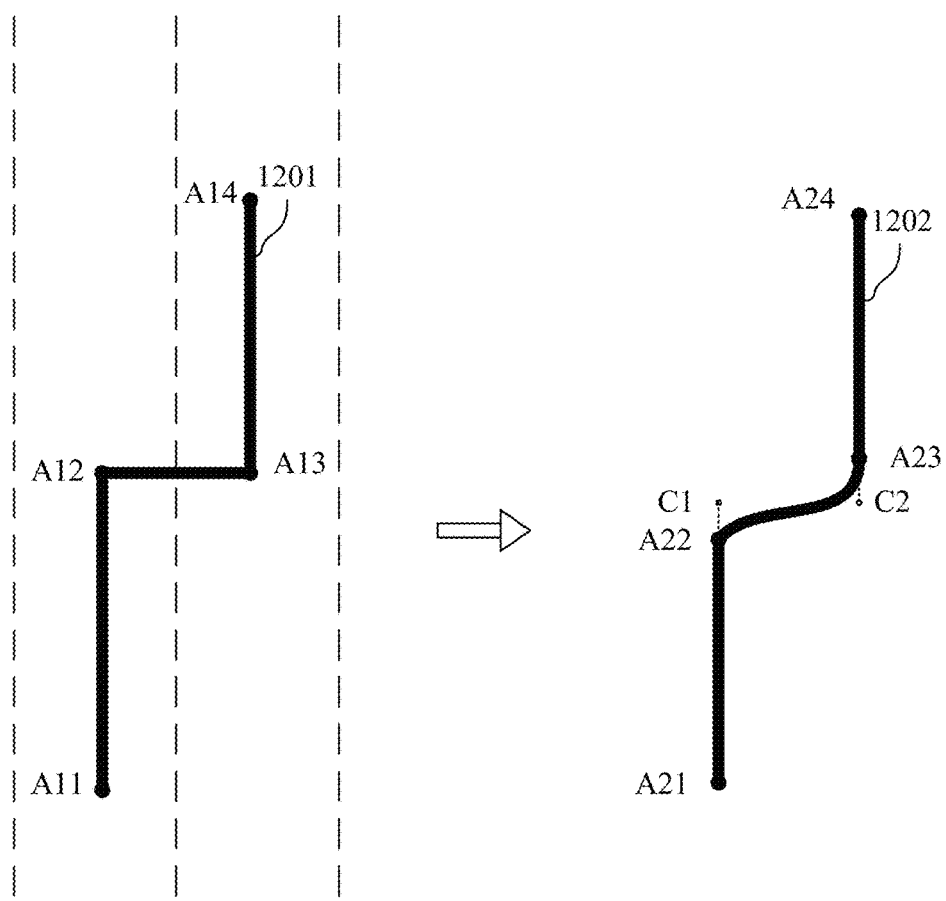
FIG. 12 is a schematic diagram of a process of generating a lane change curve according to an exemplary embodiment of the present disclosure.

With reference to FIG. 12, a starting point A11, two turning points A11 and A12, and an end point A14 exist on a to-be-processed first guide line 1201. The to-be-processed first guide line 1201 includes a first line segment A11A12, a second line segment A12A13, and a third line segment A13A14 connected end to end. The second line segment A12A13 is configured to guide the vehicle to change lanes.

2. Set back, on the first line segment, a turning point connecting the second line segment and the first line segment based on a first setback distance to obtain a first setback point.

Based on a preset first setback distance, the terminal sets back, on the first line segment A11A12, the turning point A12 connecting the second line segment A12A13 and the first line segment A11A12 to obtain a first setback point A22.

3. Set back, on the third line segment, a turning point connecting the second line segment and the third line segment based on a second setback distance to obtain a second setback point.

Based on a preset second setback distance, the terminal sets back, on the third line segment A13A14, the turning point A13 connecting the second line segment A12A13 and the third line segment A13A14 to obtain a second setback point A23.

4. Generate the first lane change curve based on the first setback point and the second setback point.

Based on the first setback point A22 and the second setback point A23 obtained in the foregoing steps, the terminal generates the first lane change curve.

In some embodiments, the terminal uses the turning point A12 as a control point C1 and the turning point A13 as a control point C2. The terminal generates a Bezier curve according to the turning point A22, the control point C1, the control point C2, and the turning point A13.

5. Connect end to end the first line segment after the setback, the first lane change curve, and the third line segment after the setback to obtain the first guide line generated at the $i^{th}$ moment.

The terminal connects end to end the first line segment A21A22 after the setback, the first lane change curve A22A23, and the third line segment A23A24 after the setback to obtain the first guide line 1202 generated at the $i^{th}$ moment.

In summary, use of a lane change curve to guide a vehicle to change lanes provides a smoother lane change guiding curve, thereby improving experience of a user using guide lines to change lanes. In addition, the lane change curve is a Bezier curve, that is, a smoother manner for a guide line for a lane change is further provided, which is closer to a guide line usage habit of the user.

Based on the example embodiment shown in FIG. 3, "Obtain a second guide line generated at an $(i+1)^{th}$ moment" in step 320 may be replaced with the following steps:

1. Obtain a to-be-processed second guide line, the to-be-processed second guide line including a fourth line segment, a fifth line segment, and a sixth line segment connected end to end, and the fifth line segment being configured to guide the vehicle to change lanes.

With reference to FIG. 12, a starting point A11, two turning points A11 and A12, and an end point A14 exist on a to-be-processed second guide line 1201. The to-be-processed second guide line 1201 includes a fourth line segment A11A12, a fifth line segment A12A13, and a sixth line segment A12A14 connected end to end. The fifth line segment A12A13 is configured to guide the vehicle to change lanes.

2. Set back, on the fourth line segment, a turning point connecting the fourth line segment and the fifth line segment based on a third setback distance to obtain a third setback point.

Based on a preset third setback distance, the terminal sets back, on the fourth line segment A11A12, the turning point A12 connecting the fourth line segment A12A13 and the fifth line segment A11A12 to obtain a third setback point A22.

3. Set back, on the sixth line segment, a turning point connecting the fifth line segment and the sixth line segment based on a fourth setback distance to obtain a fourth setback point.

Based on a preset fourth setback distance, the terminal sets back, on the sixth line segment A13A14, the turning point A13 connecting the fifth line segment A12A13 and the sixth line segment A13A14 to obtain a fourth setback point A23.

4. Generate the second lane change curve based on the third setback point and the fourth setback point.

Based on the third setback point A22 and the fourth setback point A23 obtained in the foregoing steps, the terminal generates the second lane change curve.

In some embodiments, the terminal uses the turning point A12 as a control point C1 and the turning point A13 as a control point C2. The terminal generates a Bezier curve according to the turning point A22, the control point C1, the control point C2, and the turning point A13.

5. Connect end to end the fourth line segment after the setback, the second lane change curve, and the sixth line segment after the setback to obtain the second guide line generated at the $(i+1)^{th}$ moment.

The terminal connects end to end the fourth line segment A21A22 after the setback, the second lane change curve A22A23, and the sixth line segment A23A24 after the setback to obtain the second guide line 1202 generated at the $(i+1)^{th}$ moment.

In summary, use of a lane change curve to guide a vehicle to change lanes provides a smoother lane change guiding curve, thereby improving experience of a user using guide lines to change lanes. In addition, the lane change curve is a Bezier curve, that is, a smoother manner for a guide line for a lane change is further provided, which is closer to a guide line usage habit of the user.

Figure 13:
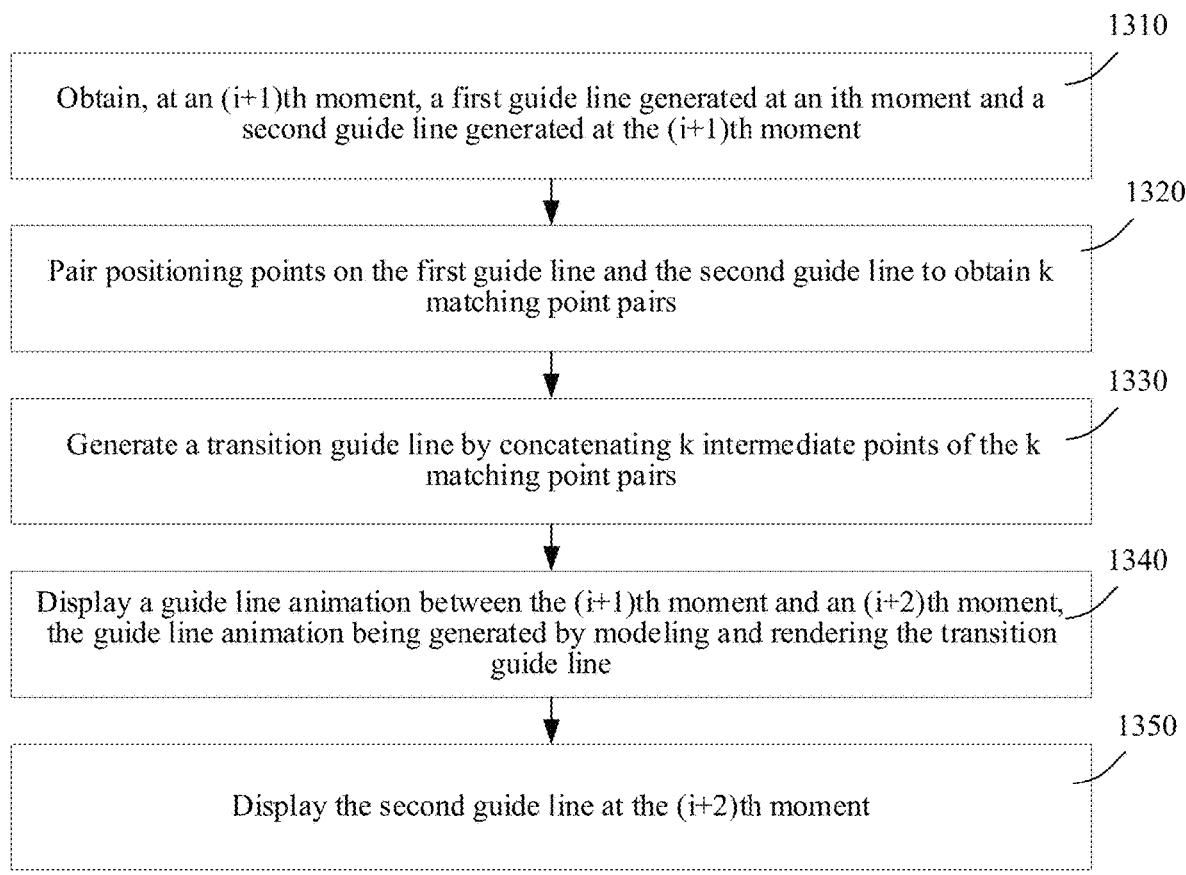
FIG. 13 is a flowchart of a guide line display method according to another exemplary embodiment of the present disclosure.

To improve display fineness and animation smoothness of a guide line animation, FIG. 13 is a flowchart of an application program control method according to an exemplary embodiment of the present disclosure. An example in which the method is applied to the terminal 220 (or the application on the terminal 220 supporting the navigation map) shown in FIG. 2 is used for description. The method includes the following steps:

Step 1310. Display and obtain, at an $(i+1)^{th}$ moment, a first guide line generated at an $i^{th}$ moment and a second guide line generated at the $(i+1)^{th}$ moment.

First guide line: The first guide line is a guide line generated at the $i^{th}$ moment and used for guiding a vehicle to a destination, and the first guide line is displayed on the navigation map interface at the $(i+1)^{th}$ moment. In some embodiments, an interval between two adjacent moments is one second. In an embodiment, the terminal obtains a current position of the vehicle through GPS positioning at the $i^{th}$ moment, and performs calculation according to lane-level road network data and the destination to obtain the first guide line.

Second guide line: The second guide line is a guide line generated at the $(i+1)^{th}$ moment and used for guiding a vehicle to a destination, and the second guide line is displayed on the navigation map interface at the $(i+2)^{th}$ moment. In some embodiments, an interval between two adjacent moments is one second. In an embodiment, the terminal obtains a current position of the vehicle through GPS positioning at the $(i+1)^{th}$ moment, and performs calculation according to lane-level road network data and the destination to obtain the second guide line.

Step 1320. Pair positioning points on the first guide line and the second guide line to obtain k matching point pairs.

In an embodiment, that the terminal pairs positioning points on the first guide line and the second guide line to obtain k matching point pairs includes: The terminal determines, on the second guide line, m' first corresponding points mapped to m positioning points on the first guide line; and/or determines, on the first guide line, n' second corresponding points mapped to n positioning points on the second guide line to obtain k matching point pairs in total, each of the matching point pairs including the positioning points and the corresponding points mapped to each other.

Step 1330. Generate a transition guide line by concatenating k intermediate points of the k matching point pairs.

Intermediate point: In an embodiment, a matching point pair includes a positioning point and a corresponding point. A positioning point on the first guide line and a corresponding point on the second guide line constitute a matching point pair. A positioning point on the second guide line and a corresponding point on the first guide line constitute a matching point pair. The intermediate point is a point located between a positioning point and a corresponding point.

A transition guide line is a guide line that transitions from the first guide line displayed at the $(i+1)^{th}$ moment to the second guide line displayed at the $(i+2)^{th}$ moment. In all the embodiments of the present disclosure, the transition guide line is the key to resolve the problem of guide line jumping. Setting a transition guide line can reduce the time to shorten a guide line change.

Step 1340. Display a guide line animation between the $(i+1)^{th}$ moment and an $(i+2)^{th}$ moment, the guide line animation being generated by modeling and rendering the transition guide line.

Figure 14:
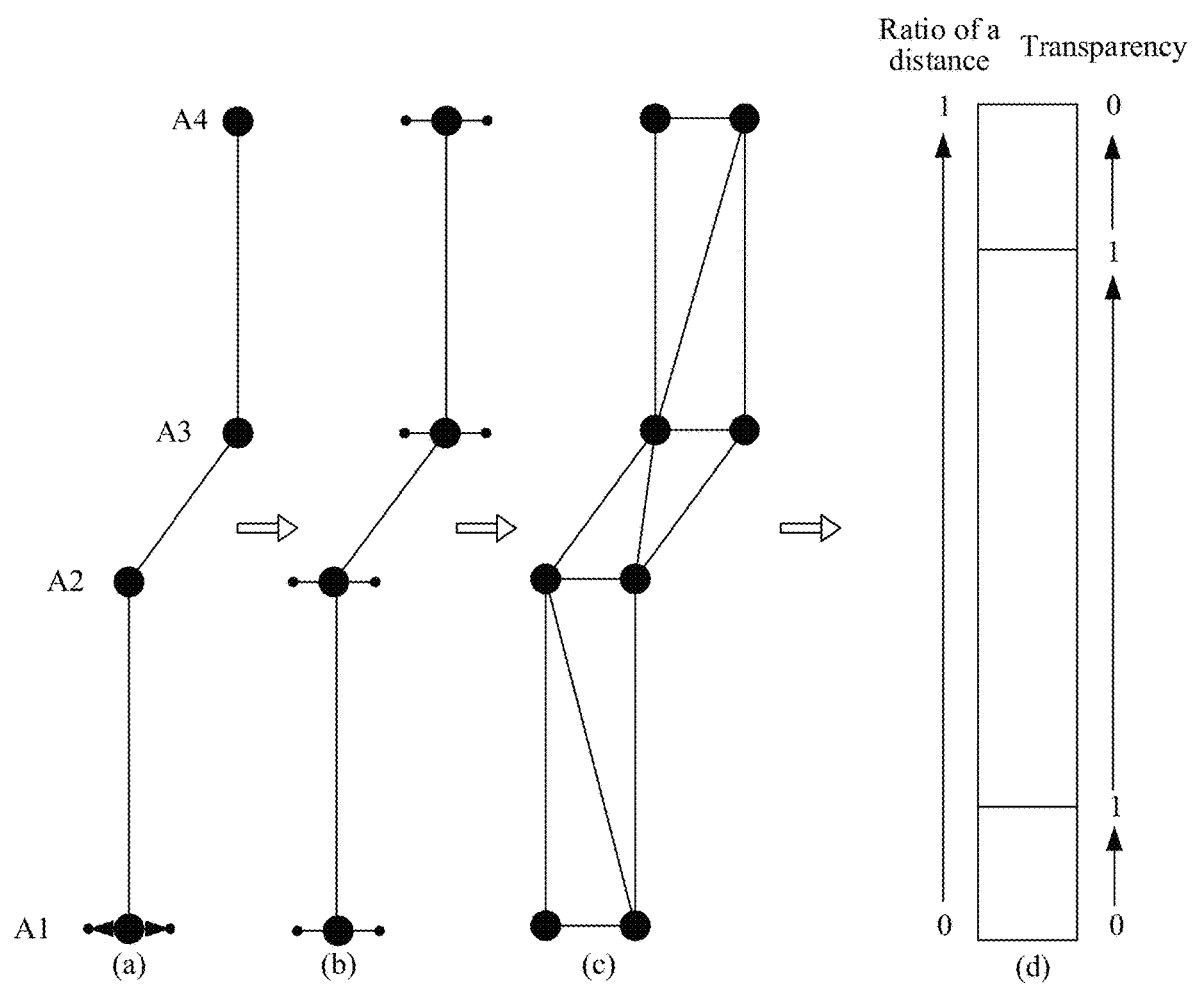
FIG. 14 is a schematic diagram of a process of generating an animation of a guide line according to an exemplary embodiment of the present disclosure.

With reference to FIG. 14, (a) of FIG. 14 shows that a starting point A1, a turning point A2, a turning point A3, and an end point A4 exist in an initial transition guide line. First, the terminal widens the starting point A1, the turning point A2, the turning point A3, and the end point A4 left and right, and obtains a cross section at each point. For example, (b) of FIG. 14 is a schematic diagram of left and right widening of a plurality of points. Then, the terminal connects the cross section points left and right to obtain a plurality of triangles. (c) of FIG. 14 shows that diagonal points of each cross section are connected, and a total of three connections are made. Finally, the terminal sets transparency of the widened guide line. In some embodiments, the terminal sets transparency of the first 20% of the guide line to change from 0 to 1, transparency of the middle 60% of the guide line to remain at 1, and transparency of the last 20% of the guide line to change from 1 to 0. With reference to the guide line 101 shown in FIG. 1, shadows of the first 20% part are gradually deepened, shadows of the middle 60% part remain unchanged, and shadows of the last 20% part are gradually lightened.

For example, transparency of the entire guide line is expressed by using the following formula:

Transparency=min(1,smoothstep(0.0,minlength,lengthratio)−smoothstep(1.0−minlength,1.0,lengthratio));

where minlength represents a length of the transparency gradient, which defines a ratio of the gradient at the head and the tail of the guide line. For example, 0.2 represents that a head gradient range is (between 0 and 0.2) and a tail gradient range is (between 0.8 and 1). lengthratio is an input parameter, which is a ratio of a distance shown in (d) of FIG. 14, with a value ranging from 0 to 1, used for representing a position on the guide line. smoothstep(0.0, minlength, lengthratio) is the transparency of the head gradient range (0.0, minlength) calculated according to lengthratio. 1−smoothstep(1.0−minlength, 1.0, lengthratio) is the transparency of the tail gradient range (1.0−minlength, 1.0) calculated according to lengthratio. In the foregoing formula, during the calculation of the transparency of the head gradient area, the value of smoothstep(1.0−minlength, 1.0, lengthratio) is 0, and during the calculation of the transparency of the tail gradient area, the value of smoothstep(0.0, minlength, lengthratio) is 1.

Step 1350. Display the second guide line at the $(i+2)^{th}$ moment.

The terminal displays, at the $(i+2)^{th}$ moment, the second guide line generated at the $(i+1)^{th}$ moment.

In summary, an animation effect of the transition guide line is achieve by performing modeling through triangulation and setting the transparency of the transition guide line, thereby alleviating a user's feeling of jumping during observation of the guide lines and further optimizing an interface effect of the guide line guiding a vehicle to a destination.

The foregoing method further reduces a guide line display difference between two adjacent frames in a guide line animation, and improves display fineness and animation smoothness of the guide line animation. In addition, a frame-level refresh effect of a liquid crystal display is improved due to reduction of difference pixels between the two adjacent frames, thereby presenting a softer and more detailed display effect of a guide line guiding a vehicle to a destination.

Figure 15:
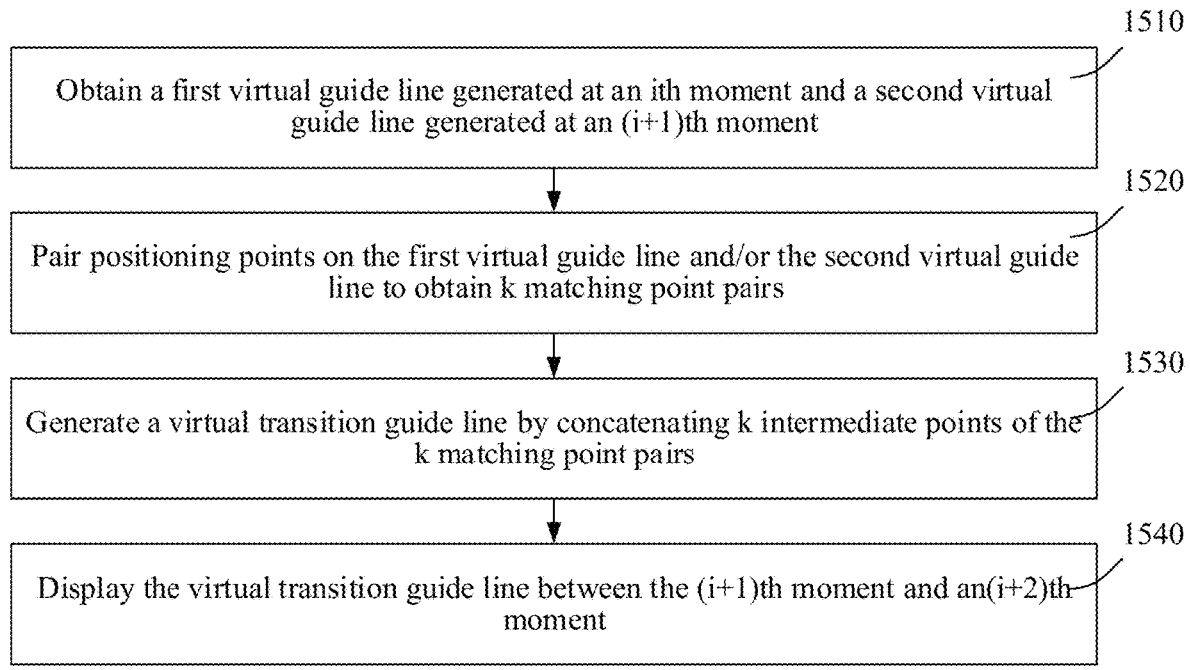
FIG. 15 is a flowchart of a guide line display method according to still another exemplary embodiment of the present disclosure.

FIG. 15 is a flowchart of a guide line display method according to an exemplary embodiment of the present disclosure. An example in which the method is applied to the terminal 220 shown in FIG. 2 is used for description. The method includes the following steps:

Step 1510: Obtain a first virtual guide line generated at an $i^{th}$ moment and a second virtual guide line generated at an $(i+1)^{th}$ moment.

In this embodiment, an application of a navigation map supported on the terminal is an application having a navigation map display function and supporting a virtual environment. The application includes but is not limited to: an application of a virtual vehicle racing game, an application of a virtual vehicle driving simulation game, and an application of an open-world role-playing game.

It may be understood that, the $i^{th}$ moment and the $(i+1)^{th}$ moment each may be a virtual time in the virtual environment supported by the application, or may be a time in a real environment, i being a positive integer. The first virtual guide line and the second virtual guide line are each used for guiding, on a virtual navigation map, a virtual vehicle to a destination in the virtual environment.

Step 1520: Pair positioning points on the first virtual guide line and/or the second virtual guide line to obtain k matching point pairs.

In an embodiment, that the terminal pairs positioning points on the first virtual guide line and/or the second virtual guide line to obtain k matching point pairs includes: The terminal achieves the pairing of the positioning points on the first virtual guide line by determining, on the second virtual guide line, m' first corresponding points mapped to m positioning points on the first virtual guide line; and/or achieves the pairing of the positioning points on the second virtual guide line by determining, on the first virtual guide line, n' second corresponding points mapped to n positioning points on the second virtual guide line.

A total of k matching point pairs are obtained through the pairing, each of the matching point pairs including the positioning points and the corresponding points mapped to each other. k is a positive integer.

Step 1530: Generate a virtual transition guide line by concatenating k intermediate points of the k matching point pairs.

The virtual transition guide line is a guide line that transitions from the first virtual guide line displayed at the $(i+1)^{th}$ moment to the second virtual guide line displayed at an $(i+2)^{th}$ moment. The virtual transition guide line is the key to resolve the problem of guide line jumping between through the adjacent moments. Setting a virtual transition guide line can smoothly display a process of a guide line change.

In an embodiment, the terminal may concatenate the k intermediate points of the k matching point pairs in a straight line and/or in a curved line. In some embodiments, a manner of concatenating any two adjacent intermediate points is the same as a manner of concatenating adjacent positioning points on the first virtual guide line or the second virtual guide line. For example, if the positioning point A1 and the positioning point A2 are concatenated in a straight line, the corresponding two intermediate points are concatenated in a straight line. If the positioning point A2 and the positioning point A3 are concatenated in a curved line, the corresponding two intermediate points are concatenated in a curved line.

Setting the manner of concatenating the intermediate points to be the same as the manner of connecting the positioning points further ensures a similarity degree between the virtual transition guide line and the first virtual guide line, thereby reducing a guide line display difference between two adjacent frames in an animation of the virtual guide line.

Step 1540: Display the virtual transition guide line between the $(i+1)^{th}$ moment and the $(i+2)^{th}$ moment.

At the $(i+1)^{th}$ moment, the terminal displays the virtual guide line generated at the $i^{th}$ moment. For example, the terminal displays the first virtual guide line at the $(i+1)^{th}$ moment. At the $(i+2)^{th}$ moment, the terminal displays the virtual guide line generated at the $(i+1)^{th}$ moment. For example, the terminal displays the second virtual guide line at the $(i+2)^{th}$ moment. The virtual transition guide line is displayed between the $(i+1)^{th}$ moment and the $(i+2)^{th}$ moment. In an embodiment, after obtaining the virtual transition guide line, the terminal performs modeling through triangulation, sets transparency of the virtual transition guide line, and finally renders the virtual transition guide line.

In summary, positioning points on a first virtual guide line generated at an $i^{th}$ moment and/or a second virtual guide line generated at an $(i+1)^{th}$ moment are paired to obtain k matching point pairs, a virtual transition guide line is generated by concatenating k intermediate points of the k matching point pairs, and the virtual transition guide line is displayed between the $(i+1)^{th}$ moment and the $(i+2)^{th}$ moment. The foregoing method reduces a virtual guide line display difference between two adjacent frames in a virtual guide line animation, and improves display fineness and animation smoothness of the virtual guide line animation. In addition, a frame-level refresh effect of a liquid crystal display is improved due to reduction of difference pixels between the two adjacent frames, thereby presenting a softer and more detailed display effect of a virtual guide line guiding a virtual vehicle to a destination in a virtual environment.

Figure 16:
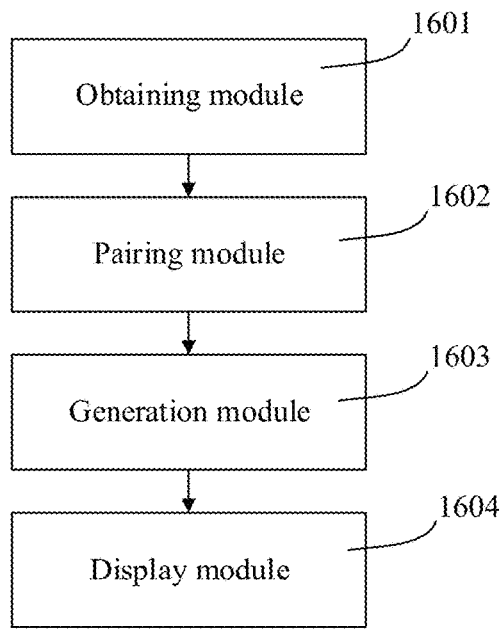
FIG. 16 is a structural block diagram of a guide line display apparatus according to an exemplary embodiment of the present disclosure.

FIG. 16 is a structural block diagram of a guide line display apparatus according to an exemplary embodiment of the present disclosure. The apparatus includes:

an obtaining module 1601, configured to obtain a first guide line generated at an $i^{th}$ moment and a second guide line generated at an $(i+1)^{th}$ moment, the first guide line and the second guide line being configured to guide a vehicle to a destination on a navigation map;

a pairing module 1602, configured to pair positioning points on the first guide line and the second guide line to obtain k matching point pairs;

a generation module 1603, configured to generate a transition guide line by concatenating k intermediate points of the k matching point pairs, the transition guide line being a guide line that transitions from the first guide line displayed at the $(i+1)^{th}$ moment to the second guide line displayed at an $(i+2)^{th}$ moment; and a display module 1604, configured to display the transition guide line between the $(i+1)^{th}$ moment and the $(i+2)^{th}$ moment.

In an example embodiment, the pairing module 1602 is further configured to determine, on the second guide line, m' first corresponding points mapped to m positioning points on the first guide line; and/or determine, on the first guide line, n' second corresponding points mapped to n positioning points on the second guide line to obtain k matching point pairs in total, each of the matching point pairs including the positioning points and the corresponding points mapped to each other.

In an example embodiment, the second guide line is a guide line generated in response to that the vehicle does not deviate from a planned route, and the pairing module 1602 is further configured to: based on existence of positioning points belonging to the same road position on the first guide line and the second guide line, determine, on the second guide line, the m' first corresponding points mapped to the m positioning points on the first guide line, and determine, on the first guide line, the n' second corresponding points mapped to the n positioning points on the second guide line to obtain the k matching point pairs in total.

In an example embodiment, the pairing module 1602 is further configured to pair $m_1$ positioning points of the first guide line with $n_1$ positioning points of the second guide line to obtain $k_1$ matching point pairs, $m_1$, $n_1$, and $k_1$ having equal values, any two paired positioning points in the $k_1$ matching point pairs indicating the same road position, and $m_1$, $n_1$, and $k_1$ each being less than a smaller value of m and n.

In an example embodiment, the pairing module 1602 is further configured to pair positioning points in the m positioning points other than the $m_1$ positioning points with a starting point of the second guide line to obtain $k_2$ matching point pairs; and pair positioning points in the n positioning points other than the $n_1$ positioning points with an end point of the first guide line to obtain $k_3$ matching point pairs.

In an example embodiment, the second guide line is a guide line generated in response to that the vehicle deviates from a planned route, and there is a first lane change curve on the first guide line, and the pairing module 1602 is further configured to determine, on the second guide line based on endpoints of the first lane change curve on the first guide line, the m' first corresponding points mapped to the m positioning points on the first guide line to obtain the k matching point pairs.

In an example embodiment, the pairing module 1602 is further configured to project two endpoints of the first lane change curve on the first guide line onto the second guide line to obtain two corresponding points, and pair the two endpoints of the first lane change curve with the two corresponding points to obtain two matching point pairs.

In an example embodiment, the pairing module 1602 is further configured to pair a starting point of the first guide line with a starting point of the second guide line to obtain a matching point pair; and pair an end point of the first guide line with an end point of the second guide line to obtain a matching point pair.

In an example embodiment, the pairing module 1602 is further configured to pair the m positioning points on the first guide line with the n positioning points on the second guide line point by point in sequence to obtain the k matching point pairs, k being equal to a larger value of m and n.

In an example embodiment, the pairing module 1602 is further configured to: in response to that j is less than m and less than n, pair a $j^{th}$ of the m positioning points with a $j^{th}$ of the n positioning points.

In an example embodiment, the pairing module 1602 is further configured to: in response to that m is greater than n and j is not less than n and not greater than m, pair a $j^{th}$ of the m positioning points with a first endpoint of the second guide line.

In an example embodiment, the pairing module 1602 is further configured to: in response to that m is less than n and j is not less than m and not greater than n, pair a $j^{th}$ of the n positioning points with a second endpoint of the first guide line.

In an example embodiment, the pairing module 1602 is further configured to determine to obtain the k matching point pairs, a value of k being m or n, the m positioning points and the n positioning points being all arranged in sequence according to a direction of progress of a road, and in this case, the first endpoint being an end point and the second endpoint being an end point; or the m positioning points and the n positioning points being all arranged in reverse order according to a direction of progress of a road, and in this case, the first endpoint being a starting point and the second endpoint being a starting point.

In an example embodiment, the pairing module 1602 is further configured to project the m positioning points on the first guide line onto the second guide line to obtain the m' first corresponding points, and project the n positioning points on the second guide line onto the first guide line to obtain the n' second corresponding points, to obtain the k matching point pairs in total.

In an example embodiment, the pairing module 1602 is further configured to project $m_2$ positioning points on the first guide line onto the second guide line to obtain $m_2$' first corresponding points, and pair the $m_2$ positioning points with the $m_2$' first corresponding points to obtain $k_4$ matching point pairs; and pair positioning points in the m positioning points other than the $m_2$ positioning points with a third endpoint of the second guide line to obtain $k_5$ matching point pairs.

In an example embodiment, the pairing module 1602 is further configured to project $n_2$ positioning points on the second guide line onto the first guide line to obtain $n_2$' second corresponding points, and pair the $n_2$ positioning points with the $n_2$' second corresponding points to obtain $k_6$ matching point pairs; and pair positioning points in the n positioning points other than the $n_2$ positioning points with a fourth endpoint of the first guide line to obtain $k_7$ matching point pairs; the third endpoint being an end point, and the fourth endpoint being a starting point; or the third endpoint being a starting point, and the fourth endpoint being an end point.

In an example embodiment, the pairing module 1602 is further configured to determine, on the second guide line based on positions of the m positioning points on the first guide line, the m' first corresponding points mapped to the m positioning points on the first guide line.

In an example embodiment, the pairing module 1602 is further configured to determine, on the first guide line based on positions of the n positioning points on the second guide line, the n' second corresponding points mapped to the n positioning points on the second guide line, and determine to obtain the k matching point pairs.

In an example embodiment, the positioning point includes an endpoint and a turning point of a guide line, and the turning point of the guide line indicates a road position at which the vehicle changes lanes.

In an example embodiment, the pairing module 1602 is further configured to pair, for a turning point in the m positioning points, the turning point with a corresponding point on the second guide line to obtain $k_8$ matching point pairs, a second ratio of the turning point being the same as a second ratio of the corresponding point.

In an example embodiment, the pairing module 1602 is further configured to pair, for a turning point in the n positioning points, the turning point with a corresponding point on the first guide line to obtain $k_9$ matching point pairs, a second ratio of the turning point being the same as a second ratio of the corresponding point.

In an example embodiment, the pairing module 1602 is further configured to pair a starting point of the first guide line with a starting point of the second guide line to obtain a matching point pair; and pair an end point of the first guide line with an end point of the second guide line to obtain a matching point pair.

The second ratio of the turning point is a ratio of a distance between the turning point and a reference point of the guide line to a total length of the guide line. The second ratio of the corresponding point is a ratio of a distance between the corresponding point and a reference point of the guide line to a total length of the guide line. The reference point is a starting point or an end point of the guide line.

In an example embodiment, there is a first lane change curve on the first guide line, the first lane change curve is configured to guide the vehicle to change lanes, and the obtaining module 1601 is further configured to obtain a to-be-processed first guide line, the to-be-processed first guide line including a first line segment, a second line segment, and a third line segment connected end to end, and the second line segment being configured to guide the vehicle to change lanes.

In an example embodiment, the obtaining module 1601 is further configured to set back, on the first line segment, a turning point connecting the second line segment and the first line segment based on a first setback distance to obtain a first setback point.

In an example embodiment, the obtaining module 1601 is further configured to set back, on the third line segment, a turning point connecting the second line segment and the third line segment based on a second setback distance to obtain a second setback point.

In an example embodiment, the obtaining module 1601 is further configured to generate the first lane change curve based on the first setback point and the second setback point.

In an example embodiment, the obtaining module 1601 is further configured to connect end to end the first line segment after the setback, the first lane change curve, and the third line segment after the setback to obtain the first guide line generated at the $i^{th}$ moment.

In an example embodiment, there is a second lane change curve on the second guide line, and the second lane change curve is configured to guide the vehicle to change lanes.

In an example embodiment, the obtaining module 1601 is further configured to obtain a to-be-processed second guide line, the to-be-processed second guide line including a fourth line segment, a fifth line segment, and a sixth line segment connected end to end, and the fifth line segment being configured to guide the vehicle to change lanes.

In an example embodiment, the obtaining module 1601 is further configured to set back, on the fourth line segment, a turning point connecting the fourth line segment and the fifth line segment based on a third setback distance to obtain a third setback point.

In an example embodiment, the obtaining module 1601 is further configured to set back, on the sixth line segment, a turning point connecting the fifth line segment and the sixth line segment based on a fourth setback distance to obtain a fourth setback point.

In an example embodiment, the obtaining module 1601 is further configured to generate the second lane change curve based on the third setback point and the fourth setback point.

In an example embodiment, the obtaining module 1601 is further configured to connect end to end the fourth line segment after the setback, the second lane change curve, and the sixth line segment after the setback to obtain the second guide line generated at the $(i+1)^{th}$ moment.

In an example embodiment, the generation module 1603 is further configured to generate the transition guide line by concatenating the k intermediate points of the k matching point pairs, any two of the intermediate points having the same first ratio within respective matching point pairs, the first ratio being a ratio of first duration to second duration, the first duration being a difference between an intermediate moment corresponding to the intermediate point and a first moment, the second duration being a difference between the $(i+1)^{th}$ moment and the first moment, and the intermediate moment being obtained through interpolation between the $i^{th}$ moment and the $(i+1)^{th}$ moment.

In summary, positioning points on a first guide line generated at an $i^{th}$ moment and/or a second guide line generated at an $(i+1)^{th}$ moment are paired to obtain k matching point pairs, a transition guide line is generated by concatenating k intermediate points of the k matching point pairs, and the transition guide line is displayed between the $(i+1)^{th}$ moment and the $(i+2)^{th}$ moment. This alleviates a user's feeling of jumping during observation of the guide line and further optimizes an interface effect of the guide line guiding a vehicle to a destination.

The term module (and other similar terms such as sub-module, unit, subunit, etc.) in this disclosure may refer to a software module, a hardware module, or a combination thereof. A software module (e.g., computer program) may be developed using a computer programming language. A hardware module may be implemented using processing circuitry and/or memory. Each module can be implemented using one or more processors (or processors and memory). Likewise, a processor (or processors and memory) can be used to implement one or more modules. Moreover, each module can be part of an overall module that includes the functionalities of the module.

The foregoing apparatus further reduces a guide line display difference between two adjacent frames in a guide line animation, and improves display fineness and animation smoothness of the guide line animation. In addition, a frame-level refresh effect of a liquid crystal display is improved due to reduction of difference pixels between the two adjacent frames, thereby presenting a softer and more detailed display of a guide line guiding a vehicle to a destination.

Figure 17:
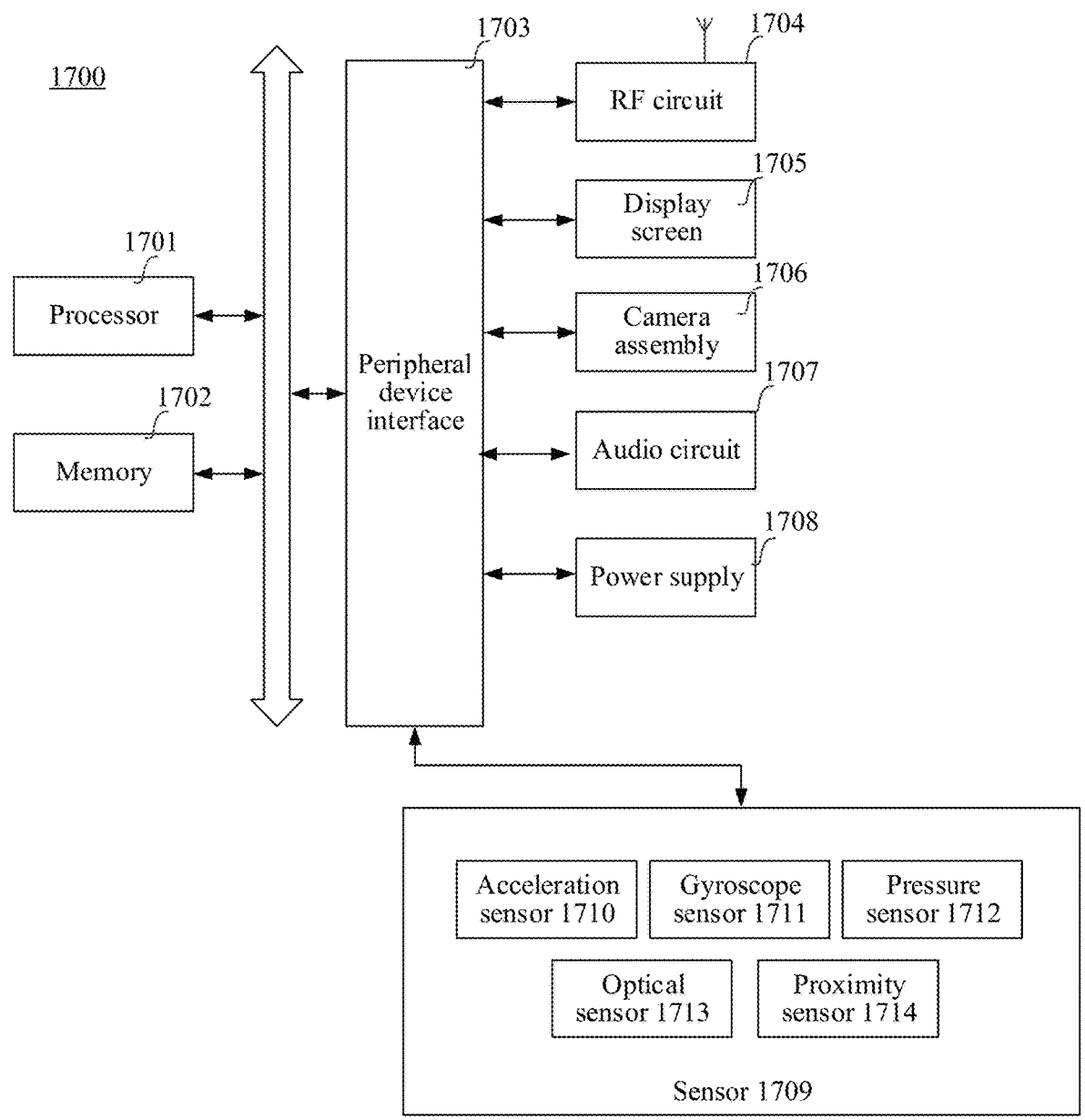
FIG. 17 is a structural block diagram of a computer device according to an exemplary embodiment of the present disclosure.

FIG. 17 is a structural block diagram of a computer device 1700 according to an exemplary embodiment of the present disclosure. The computer device 1700 may be a portable mobile terminal, such as a smartphone, a tablet computer, a Moving Picture Experts Group Audio Layer III (MP3) player, a Moving Picture Experts Group Audio Layer IV (MP4) player, a notebook computer, or a desktop computer. The computer device 1700 may also be referred to as another name such as user equipment, a portable terminal, a laptop terminal, or a desktop terminal.

Usually, the computer device 1700 includes: a processor 1701 and a memory 1702.

The processor 1701 may include one or more processing cores, for example, a 4-core processor or an 8-core processor. The processor 1701 may be implemented in at least one hardware form of a digital signal processor (DSP), a field-programmable gate array (FPGA), and a programmable logic array (PLA). The processor 1701 may also include a main processor and a coprocessor. The main processor is a processor configured to process data in an awake state, and is also referred to as a central processing unit (CPU). The coprocessor is a low power consumption processor configured to process data in a standby state. In some embodiments, the processor 1701 may be integrated with a graphics processing unit (GPU). The GPU is configured to render and draw content that needs to be displayed on a display screen. In some embodiments, the processor 1701 may further include an artificial intelligence (AI) processor. The AI processor is configured to process computing operations related to machine learning.

The memory 1702 may include one or more computer-readable storage media. The computer-readable storage medium may be non-transitory. The memory 1702 may further include a high-speed random access memory and a nonvolatile memory, for example, one or more disk storage devices or flash storage devices. In some embodiments, the non-transitory computer-readable storage medium in the memory 1702 is configured to store at least one instruction, the at least one instruction being used for execution by the processor 1701 to implement the guide line display method provided in the method embodiments of the present disclosure.

In some embodiments, the computer device 1700 may further include: a peripheral device interface 1703 and at least one peripheral device. The processor 1701, the memory 1702, and the peripheral device interface 1703 may be connected through a bus or a signal cable. Each peripheral device may be connected to the peripheral device interface 1703 through a bus, a signal cable, or a circuit board. For example, the peripheral device may include at least one of: a radio frequency (RF) circuit 1704, a display screen 1705, a camera assembly 1706, an audio circuit 1707, and a power supply 1708.

The peripheral interface 1703 may be configured to connect the at least one peripheral related to input/output (I/O) to the processor 1701 and the memory 1702. In some embodiments, the processor 1701, the memory 1702 and the peripheral device interface 1703 are integrated on the same chip or circuit board. In some other embodiments, any one or two of the processor 1701, the memory 1702, and the peripheral device interface 1703 may be implemented on a single chip or circuit board. This is not limited in this embodiment.

The RF circuit 1704 is configured to receive and transmit an RF signal, also referred to as an electromagnetic signal. The RF circuit 1704 communicates with a communication network and other communication devices through the electromagnetic signal. The RF circuit 1704 converts an electrical signal into an electromagnetic signal for transmission, or converts a received electromagnetic signal into an electrical signal. In some embodiments, the RF circuit 1704 includes an antenna system, an RF transceiver, one or more amplifiers, a tuner, an oscillator, a digital signal processor, a codec chip set, a subscriber identity module card, and the like. The RF circuit 1704 may communicate with another terminal by using at least one wireless communications protocol. The wireless communication protocol includes, but is not limited to: a world wide web, a metropolitan area network, an intranet, generations of mobile communication networks (2G, 3G, 4G, and 17G), a wireless local area network and/or a wireless fidelity (Wi-Fi) network. In some embodiments, the RF 1704 may further include a circuit related to NFC, which is not limited in the present disclosure.

The display screen 1705 is configured to display a user interface (UI). The UI may include a graph, text, an icon, a video, and any combination thereof. In response to that the display screen 1705 is a touch display screen, the display screen 1705 further has a capability of acquiring a touch signal on or above a surface of the display screen 1705. The touch signal may be inputted to the processor 1701 as a control signal for processing. In this case, the display screen 1705 may be further configured to provide a virtual button and/or a virtual keyboard that are/is also referred to as a soft button and/or a soft keyboard. In some embodiments, there may be one display screen 1705, disposed on a front panel of the computer device 1700. In some other embodiments, there may be at least two display screens 1705, respectively disposed on different surfaces of the computer device 1700 or designed in a folded shape. In some other embodiments, the display screen 1705 may be a flexible display screen, disposed on a curved surface or a folded surface of the computer device 1700. Even, the display screen 1705 may be further set in a non-rectangular irregular pattern, namely, a special-shaped screen. The display screen 1705 may be prepared by using materials such as a liquid crystal display (LCD), an organic light-emitting diode (OLED), or the like.

The camera assembly 1706 is configured to capture images or videos. In some embodiments, the camera assembly 1706 includes a front-facing camera and a rear-facing camera. Generally, the front-facing camera is disposed on the front panel of the terminal, and the rear-facing camera is disposed on a back surface of the terminal. In some embodiments, there are at least two rear cameras, which are respectively any of a main camera, a depth-of-field camera, a wide-angle camera, and a telephoto camera, to achieve background blur through fusion of the main camera and the depth-of-field camera, panoramic photographing and virtual reality (VR) photographing through fusion of the main camera and the wide-angle camera, or other fusion photographing functions. In some embodiments, the camera assembly 1706 may further include a flash. The flash may be a monochrome temperature flash, or may be a double color temperature flash. The double color temperature flash refers to a combination of a warm light flash and a cold light flash, and may be used for light compensation under different color temperatures.

The audio circuit 1707 may include a microphone and a speaker. The microphone is configured to collect sound waves of a user and an environment, and convert the sound waves into an electrical signal to input to the processor 1701 for processing, or input to the RF circuit 1704 for implementing voice communication. For the purpose of stereo collection or noise reduction, there may be a plurality of microphones, respectively disposed at different portions of the computer device 1700. The microphone may further be an array microphone or an omni-directional collection type microphone. The speaker is configured to convert the electrical signal from the processor 1701 or the RF circuit 1704 into sound waves. The speaker may be a conventional film speaker, or may be a piezoelectric ceramic speaker. When the speaker is the piezoelectric ceramic speaker, the speaker not only can convert an electric signal into acoustic waves audible to a human being, but also can convert an electric signal into acoustic waves inaudible to a human being, for ranging and other purposes. In some embodiments, the audio circuit 1707 may further include an earphone jack.

The power supply 1708 is configured to supply power to components in the terminal 1700. The power supply 1708 may be an alternating current, a direct current, a primary battery, or a rechargeable battery. When the power supply 1708 includes a rechargeable battery, and the rechargeable battery may be a wired rechargeable battery or a wireless rechargeable battery. The wired rechargeable battery is a battery charged through a wired circuit, and the wireless rechargeable battery is a battery charged through a wireless coil. The rechargeable battery may be further configured to support a fast charging technology.

In some embodiments, the computer device 1700 further includes one or more sensors 1709. The one or more sensors 1709 include, but are not limited to: an acceleration sensor 1710, a gyroscope sensor 1711, a pressure sensor 1712, an optical sensor 1713, and a proximity sensor 1714.

The acceleration sensor 1710 may detect a magnitude of acceleration on three coordinate axes of a coordinate system established with the computer device 1700. For example, the acceleration sensor 1710 may be configured to detect components of gravity acceleration on the three coordinate axes. The processor 1701 may control, according to a gravity acceleration signal collected by the acceleration sensor 1710, the display screen 1705 to display the user interface in a frame view or a portrait view. The acceleration sensor 1710 may be further configured to acquire motion data of a game or a user.

The gyroscope sensor 1711 may detect a body direction and a rotation angle of the computer device 1700. The gyroscope sensor 1711 may cooperate with the acceleration sensor 1710 to collect a 3D action by the user on the computer device 1700. The processor 1701 may implement the following functions according to the data acquired by the gyroscope sensor 1711: motion sensing (such as changing the UI according to a tilt operation of the user), image stabilization at shooting, game control, and inertial navigation.

The pressure sensor 1712 may be disposed at a side frame of the computer device 1700 and/or on a lower layer of the display screen 1705. When the pressure sensor 1712 is disposed at the side frame of the computer device 1700, a holding signal of the user on the computer device 1700 may be detected. The processor 1701 performs left and right hand recognition or a quick operation according to the holding signal acquired by the pressure sensor 1712. When the pressure sensor 1712 is disposed on the low layer of the display screen 1705, the processor 1701 controls, according to a pressure operation of the user on the display screen 1705, an operable control on the UI. The operable control includes at least one of a button control, a scroll-bar control, an icon control, and a menu control.

The optical sensor 1713 is configured to acquire ambient light intensity. In an embodiment, the processor 1701 may control display luminance of the display screen 1705 according to the ambient light intensity collected by the optical sensor 1713. For example, when the ambient light intensity is relatively high, the display luminance of the display screen 1705 is increased. When the ambient light intensity is relatively low, the display luminance of the display screen 1705 is reduced. In another embodiment, the processor 1701 may further dynamically adjust a camera parameter of the camera component 1706 according to the ambient light intensity acquired by the optical sensor 1713.

The proximity sensor 1714, also referred to as a distance sensor, is generally disposed on the front panel of the computer device 1700. The proximity sensor 1714 is configured to collect a distance between the user and the front surface of the computer device 1700. In an embodiment, when the proximity sensor 1714 detects that the distance between the user and the front surface of the computer device 1700 gradually becomes smaller, the processor 1701 controls the display screen 1705 to switch from a screen-on state to a screen-off state. When the proximity sensor 1714 detects that the distance between the user and the front surface of the computer device 1700 gradually becomes larger, the processor 1701 controls the display screen 1705 to switch from a screen-off state to a screen-on state.

A person skilled in the art may understand that the structure shown in FIG. 17 constitutes no limitation on the computer device 1700, and the computer device may include more or fewer components than those shown in the figure, or some components may be combined, or a different component deployment may be used.

The present disclosure further provides a computer-readable storage medium, the storage medium storing at least one instruction, at least one program, and a code set or an instruction set, the at least one instruction, the at least one program, and the code set or the instruction set being loaded and executed by a processor to implement the guide line display method provided in the foregoing method embodiments.

The present disclosure provides a computer program product or a computer program, including computer instructions, the computer instructions being stored in a computer-readable storage medium. A processor of a computer device reads the computer instructions from the computer-readable storage medium, and executes the computer instructions, to cause the computer device to perform the guide line display method provided in the foregoing method embodiments. The computer program product or the computer program may be stored in a computer-readable storage medium. The storage medium mentioned above may be a read-only memory, a magnetic disk, or an optical disc.

What is claimed is:

1. A guide line display method, the method being performed by a terminal and comprising:
obtaining a first guide line generated at an $i^{th}$ moment and a second guide line generated at an $(i+1)^{th}$ moment, the first guide line and the second guide line being configured to guide a vehicle to a destination on a navigation map, and i being a positive integer;
pairing positioning points on the first guide line and the second guide line to obtain k matching point pairs, k being a positive integer;
generating a transition guide line by concatenating k intermediate points of the k matching point pairs, the transition guide line being a guide line that transitions from the first guide line displayed at the $(i+1)^{th}$ moment to the second guide line displayed at an $(i+2)^{th}$ moment; and
displaying the transition guide line between the $(i+1)^{th}$ moment and the $(i+2)^{th}$ moment.

2. The method according to claim 1, wherein the pairing positioning points on the first guide line and the second guide line to obtain k matching point pairs comprises:
determining, on the second guide line, m' first corresponding points mapped to m positioning points on the first guide line; and determining, on the first guide line, n' second corresponding points mapped to n positioning points on the second guide line, to obtain k matching point pairs in total,
wherein a matching pair of the matching point pairs comprises a positioning point and a corresponding point mapped to each other, and m, m', n, and n' each being a positive integer.

3. The method according to claim 2, wherein the second guide line is a guide line generated in response to that the vehicle does not deviate from a planned route; and
the determining, on the second guide line, m' first corresponding points mapped to m positioning points on the first guide line, and the determining, on the first guide line, n' second corresponding points mapped to n positioning points on the second guide line to obtain k matching point pairs in total comprises:
based on existence of positioning points belonging to a same road position on the first guide line and the second guide line, determining, on the second guide line, the m' first corresponding points mapped to the m positioning points on the first guide line, and determining, on the first guide line, the n' second corresponding points mapped to the n positioning points on the second guide line, to obtain the k matching point pairs in total.

4. The method according to claim 3, wherein the based on existence of positioning points belonging to the same road position on the first guide line and the second guide line, determining, on the second guide line, the m' first corresponding points mapped to the m positioning points on the first guide line, and determining, on the first guide line, the n' second corresponding points mapped to the n positioning points on the second guide line, to obtain the k matching point pairs in total comprises:
pairing $m_1$ positioning points of the first guide line with $n_1$ positioning points of the second guide line to obtain $k_1$ matching point pairs, $m_1$, $n_1$, and $k_1$ having equal values, two paired positioning points in one of the $k_1$ matching point pairs indicating the same road position, $m_1$, $n_1$, and $k_1$ each being a positive integer, and $m_1$, $n_1$, and $k_1$ each being less than a smaller value of m and n; and
pairing positioning points in the m positioning points other than the $m_1$ positioning points of the first guide line with a starting point of the second guide line to obtain $k_2$ matching point pairs; and pairing positioning points in the n positioning points other than the $n_1$ positioning points of the second guide line with an end point of the first guide line to obtain $k_3$ matching point pairs, $k_2$ and $k_3$ each being a positive integer.

5. The method according to claim 2, wherein the second guide line is a guide line generated in response to that the vehicle deviates from a planned route, and there is a first lane change curve on the first guide line; and the determining, on the second guide line, m' first corresponding points mapped to m positioning points on the first guide line comprises:

determining, on the second guide line based on endpoints of the first lane change curve on the first guide line, the m' first corresponding points mapped to the m positioning points on the first guide line to obtain the k matching point pairs.

6. The method according to claim 5, wherein the determining, on the second guide line based on endpoints of the first lane change curve on the first guide line, the m' first corresponding points mapped to the m positioning points on the first guide line to obtain the k matching point pairs comprises:

projecting two endpoints of the first lane change curve on the first guide line onto the second guide line to obtain two corresponding points, and pairing the two endpoints of the first lane change curve with the two corresponding points of the second guide line to obtain two matching point pairs; and pairing a starting point of the first guide line with a starting point of the second guide line to obtain a matching point pair of the k matching point pairs; and pairing an end point of the first guide line with an end point of the second guide line to obtain a matching point pair of the k matching point pairs.

7. The method according to claim 2, wherein the determining, on the second guide line, m' first corresponding points mapped to m positioning points on the first guide line, and the determining, on the first guide line, n' second corresponding points mapped to n positioning points on the second guide line to obtain k matching point pairs in total comprises:

pairing the m positioning points on the first guide line with the n positioning points on the second guide line point by point in sequence to obtain the k matching point pairs, k being equal to a larger value of m and n.

8. The method according to claim 7, wherein the pairing the m positioning points on the first guide line with the n positioning points on the second guide line point by point in sequence to obtain the k matching point pairs comprises:

in response to that j is less than m and less than n, pairing a $j^{th}$ of the m positioning points with a $j^{th}$ of the n positioning points, j being a positive integer;

in response to that m is greater than n, and that j is not less than n and not greater than m, pairing a $j^{th}$ of the m positioning points with a first endpoint of the second guide line;

in response to that m is less than n, and that j is not less than m and not greater than n, pairing a $j^{th}$ of the n positioning points with a second endpoint of the first guide line; and obtaining the k matching point pairs, wherein in response to the m positioning points and the n positioning points being arranged in sequence according to a direction of progress of a road, the first endpoint is an end point and the second endpoint is an end point; and in response to the m positioning points and the n positioning points being arranged in reverse order according to the direction of progress of the road, the first endpoint is a starting point and the second endpoint is a starting point.

9. The method according to claim 2, wherein the determining, on the second guide line, m' first corresponding points mapped to m positioning points on the first guide line, and the determining, on the first guide line, n' second corresponding points mapped to n positioning points on the second guide line to obtain k matching point pairs in total comprises:

projecting the m positioning points on the first guide line onto the second guide line to obtain the m' first corresponding points, and projecting the n positioning points on the second guide line onto the first guide line to obtain the n' second corresponding points, to obtain the k matching point pairs in total.

10. The method according to claim 9, wherein the projecting the m positioning points on the first guide line onto the second guide line to obtain the m' first corresponding points, and projecting the n positioning points on the second guide line onto the first guide line to obtain the n' second corresponding points, to obtain the k matching point pairs in total comprises:

projecting $m_2$ positioning points on the first guide line onto the second guide line to obtain $m_{2'}$ first corresponding points, and pairing the $m_2$ positioning points with the $m_{2'}$ first corresponding points to obtain $k_4$ matching point pairs; and pairing positioning points in the m positioning points other than the $m_2$ positioning points with a third endpoint of the second guide line to obtain $k_5$ matching point pairs; and projecting $n_2$ positioning points on the second guide line onto the first guide line to obtain $n_{2'}$ second corresponding points, and pairing the $n_2$ positioning points with the $n_{2'}$ second corresponding points to obtain $k_6$ matching point pairs; and pairing positioning points in the n positioning points other than the $n_2$ positioning points with a fourth endpoint of the first guide line to obtain $k_7$ matching point pairs;

the third endpoint being an end point, and the fourth endpoint being a starting point; or the third endpoint being a starting point, the fourth endpoint being an end point, and $m_2$, $m_{2'}$, $n_2$, $n_{2'}$, $k_4$, $k_5$, $k_6$ and $k_7$ each being a positive integer.

11. The method according to claim 2, wherein the determining, on the second guide line, m' first corresponding points mapped to m positioning points on the first guide line, and/or determining, on the first guide line, n' second corresponding points mapped to n positioning points on the second guide line to obtain k matching point pairs in total comprises:

determining, on the second guide line based on positions of the m positioning points on the first guide line, the m' first corresponding points mapped to the m positioning points on the first guide line;

determining, on the first guide line based on positions of the n positioning points on the second guide line, the n' second corresponding points mapped to the n positioning points on the second guide line; and determining to obtain the k matching point pairs.

12. The method according to claim 11, wherein the positioning point comprises an endpoint and a turning point of a guide line, and the turning point of the guide line indicates a road position at which the vehicle changes lanes; and the determining, on the second guide line based on positions of the m positioning points on the first guide line, the m' first corresponding points mapped to the m positioning points on the first guide line; and determining, on the first guide line based on positions of the n positioning points on the second guide line, the n' second corresponding points mapped to the n positioning points on the second guide line comprises:

obtain $k_8$ matching point pairs by: pairing, for a first turning point in the m positioning points, the first turning point with a first corresponding point on the second guide line, a second ratio of the first turning point being the same as a second ratio of the first corresponding point;

obtain $k_9$ matching point pairs by: pairing, for a second turning point in the n positioning points, the turning point with a second corresponding point on the first guide line to, a second ratio of the second turning point being the same as a second ratio of the second corresponding point; and pairing a starting point of the first guide line with a starting point of the second guide line to obtain a matching point pair of the k matching point pairs; and pairing an end point of the first guide line with an end point of the second guide line to obtain a matching point pair of the k matching point pairs;

the second ratio of a turning point being a ratio of a distance between the turning point and a reference point of the guide line to a total length of the guide line, the second ratio of a corresponding point being a ratio of a distance between the corresponding point and a reference point of the guide line to a total length of the guide line, the reference point being a starting point or an end point of the guide line, and $k_8$ and $k_9$ each being a positive integer.

13. The method according to claim 1, wherein there is a first lane change curve on the first guide line, and the first lane change curve is configured to guide the vehicle to change lanes; and the obtaining a first guide line generated at an $i^{th}$ moment comprises:

obtaining a first guide line to be processed, the first guide line comprising a first line segment, a second line segment, and a third line segment connected end to end, and the second line segment being configured to guide the vehicle to change lanes;

setting back, on the first line segment, a turning point connecting the second line segment and the first line segment based on a first setback distance to obtain a first setback point and the first line segment after the setback;

setting back, on the third line segment, a turning point connecting the second line segment and the third line segment based on a second setback distance to obtain a second setback point and the first line segment after the setback;

generating the first lane change curve based on the first setback point and the second setback point; and connecting end to end the first line segment after the setback, the first lane change curve, and the third line segment after the setback to obtain the first guide line generated at the $i^{th}$ moment.

14. The method according to claim 1, wherein there is a second lane change curve on the second guide line, the second lane change curve is configured to guide the vehicle to change lanes, and the obtaining a second guide line generated at an $(i+1)^{th}$ moment comprises:

obtaining a second guide line to be processed, the second guide line comprising a fourth line segment, a fifth line segment, and a sixth line segment connected end to end, and the fifth line segment being configured to guide the vehicle to change lanes;

setting back, on the fourth line segment, a turning point connecting the fourth line segment and the fifth line segment based on a third setback distance to obtain a third setback point and the fourth line segment after the setback;

setting back, on the sixth line segment, a turning point connecting the fifth line segment and the sixth line segment based on a fourth setback distance to obtain a fourth setback point and the sixth line segment after the setback;

generating the second lane change curve based on the third setback point and the fourth setback point; and connecting end to end the fourth line segment after the setback, the second lane change curve, and the sixth line segment after the setback to obtain the second guide line generated at the $(i+1)^{th}$ moment.

15. The method according to claim 1, wherein the generating a transition guide line by concatenating k intermediate points of the k matching point pairs comprises:

generating the transition guide line by concatenating the k intermediate points of the k matching point pairs, wherein two of the intermediate points have the same first ratio within respective matching point pairs, the first ratio being a ratio of first duration to second duration, the first duration being a difference between an intermediate moment corresponding to the intermediate point and a first moment, the second duration being a difference between the $(i+1)^{th}$ moment and the first moment, and the intermediate moment being obtained through interpolation between the $i^{th}$ moment and the $(i+1)^{th}$ moment.

16. A guide line display apparatus, comprising:

at least one processor and at least one memory, the at least one memory storing a computer program, and the computer program being loaded and executed by the at least one processor to implement:

obtaining a first guide line generated at an $i^{th}$ moment and a second guide line generated at an $(i+1)^{th}$ moment, the first guide line and the second guide line being configured to guide a vehicle to a destination on a navigation map, and i being a positive integer;

pairing positioning points on the first guide line and the second guide line to obtain k matching point pairs, k being a positive integer;

generating a transition guide line by concatenating k intermediate points of the k matching point pairs, the transition guide line being a guide line that transitions from the first guide line displayed at the $(i+1)^{th}$ moment to the second guide line displayed at an $(i+2)^{th}$ moment; and displaying the transition guide line between the $(i+1)^{th}$ moment and the $(i+2)^{th}$ moment.

17. The apparatus according to claim 16, wherein the pairing positioning points on the first guide line and the second guide line to obtain k matching point pairs comprises:

determining, on the second guide line, m' first corresponding points mapped to m positioning points on the first guide line; and determining, on the first guide line, n' second corresponding points mapped to n positioning points on the second guide line, to obtain k matching point pairs in total, wherein a matching pair of the matching point pairs comprises a positioning point and a corresponding point mapped to each other, and m, m', n, and n' each being a positive integer.

18. The apparatus according to claim 17, wherein the second guide line is a guide line generated in response to that the vehicle does not deviate from a planned route; and the determining, on the second guide line, m' first corresponding points mapped to m positioning points on the first guide line, and the determining, on the first guide line, n' second corresponding points mapped to n positioning points on the second guide line to obtain k matching point pairs in total comprises:

based on existence of positioning points belonging to a same road position on the first guide line and the second guide line, determining, on the second guide line, the m' first corresponding points mapped to the m positioning points on the first guide line, and determining, on the first guide line, the n' second corresponding points mapped to the n positioning points on the second guide line, to obtain the k matching point pairs in total.

19. The apparatus according to claim 18, wherein the based on existence of positioning points belonging to the same road position on the first guide line and the second guide line, determining, on the second guide line, the m' first corresponding points mapped to the m positioning points on the first guide line, and determining, on the first guide line, the n' second corresponding points mapped to the n positioning points on the second guide line, to obtain the k matching point pairs in total comprises:

pairing $m_1$ positioning points of the first guide line with $n_1$ positioning points of the second guide line to obtain $k_1$ matching point pairs, $m_1$, $n_1$, and $k_1$ having equal values, two paired positioning points in one of the $k_1$ matching point pairs indicating the same road position, $m_1$, $n_1$, and $k_1$ each being a positive integer, and $m_1$, $n_1$, and $k_1$ each being less than a smaller value of m and n; and pairing positioning points in the m positioning points other than the $m_1$ positioning points of the first guide line with a starting point of the second guide line to obtain $k_2$ matching point pairs; and pairing positioning points in the n positioning points other than the $n_1$ positioning points of the second guide line with an end point of the first guide line to obtain $k_3$ matching point pairs, $k_2$ and $k_3$ each being a positive integer.

20. A non-transitory computer-readable storage medium, storing a computer program, the computer program being loaded and executed by at least one processor to implement:

obtaining a first guide line generated at an $i^{th}$ moment and a second guide line generated at an $(i+1)^{th}$ moment, the first guide line and the second guide line being configured to guide a vehicle to a destination on a navigation map, and i being a positive integer;

pairing positioning points on the first guide line and the second guide line to obtain k matching point pairs, k being a positive integer;

generating a transition guide line by concatenating k intermediate points of the k matching point pairs, the transition guide line being a guide line that transitions from the first guide line displayed at the $(i+1)^{th}$ moment to the second guide line displayed at an $(i+2)^{th}$ moment; and displaying the transition guide line between the $(i+1)^{th}$ moment and the $(i+2)^{th}$ moment.

* * * * *